United States Patent
Dally

(10) Patent No.: US 12,355,392 B2
(45) Date of Patent: Jul. 8, 2025

(54) DRIVE SYSTEM FOR SINGLE AXIS SOLAR TRACKING

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Reno, NV (US)

(*) Notice: Subject to any disclaimer, the term of this patent is extended or adjusted under 35 U.S.C. 154(b) by 77 days.

(21) Appl. No.: 18/491,634

(22) Filed: Oct. 20, 2023

(65) Prior Publication Data

US 2024/0136972 A1  Apr. 25, 2024
US 2024/0235463 A9  Jul. 11, 2024

Related U.S. Application Data

(60) Provisional application No. 63/417,968, filed on Oct. 20, 2022.

(51) Int. Cl.
*H02S 20/32* (2014.01)
*F24S 30/425* (2018.01)
*F24S 50/20* (2018.01)
*F24S 30/00* (2018.01)

(52) U.S. Cl.
CPC ............ *H02S 20/32* (2014.12); *F24S 30/425* (2018.05); *F24S 50/20* (2018.05); *F24S 2030/133* (2018.05)

(58) Field of Classification Search
CPC .......... H02S 20/32; F24S 30/425; F24S 50/20
USPC ....................................................... 248/122.1
See application file for complete search history.

(56) References Cited

U.S. PATENT DOCUMENTS

| | | | |
|---|---|---|---|
| 8,399,759 B2* | 3/2013 | Luo | F24S 30/455 |
| | | | 136/246 |
| 9,927,150 B2 | 3/2018 | Eckl et al. | |
| 10,326,401 B2* | 6/2019 | Wu | F24S 30/455 |
| 11,646,694 B2* | 5/2023 | Dally | H02S 20/32 |
| | | | 136/246 |
| 11,689,151 B2* | 6/2023 | Kufner | F24S 30/425 |
| | | | 136/246 |
| 11,946,587 B2* | 4/2024 | Dally | F24S 40/85 |

* cited by examiner

*Primary Examiner* — Todd M Epps
(74) *Attorney, Agent, or Firm* — Sherman IP LLP; Kenneth L. Sherman; Steven Laut

(57) ABSTRACT

An embodiment for a solar tracker assembly includes a component having multiple pulleys or slide surfaces. A first torque tube is connected with the component. The first torque tube includes a cable slot. A first pull cable is connected to a first and a second pulley of the multiple pulleys or to a first and a second slide surface of the multiple slide surfaces. A second pull cable is connected to a third and a fourth pulley of the multiple pulleys or to a third and a fourth slide surface of the multiple slide surfaces. A first post is connected with the torque tube. The first post includes a connection point connected to the first pull cable and the second pull cable.

20 Claims, 61 Drawing Sheets

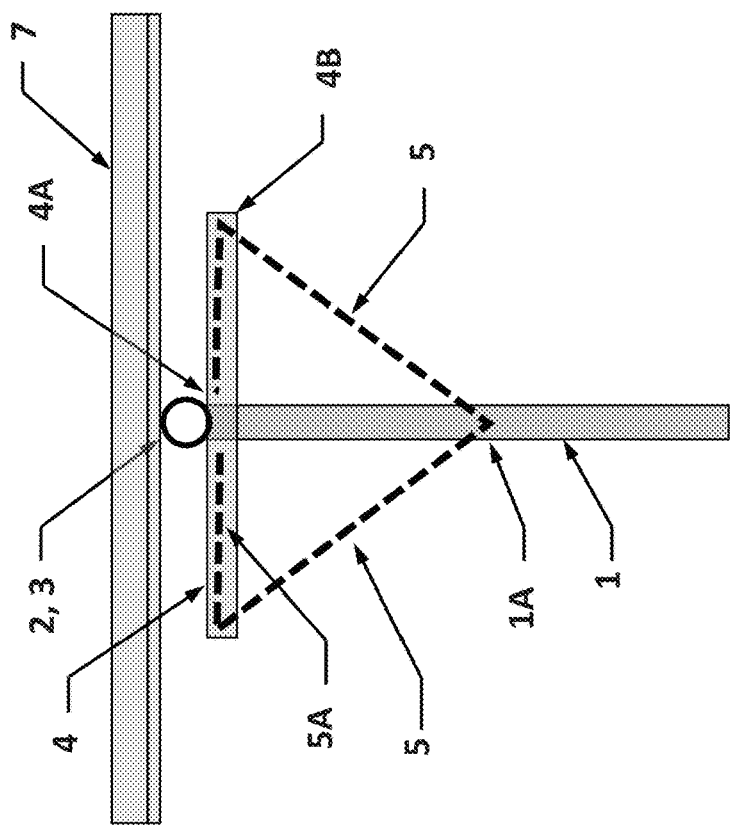
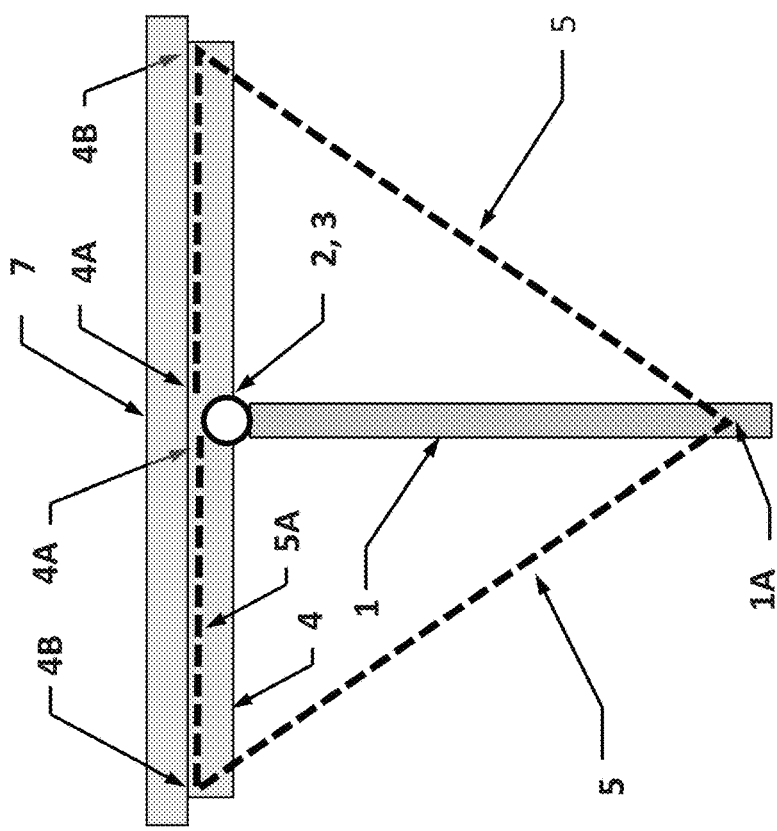
FIG. 6B
FIG. 6A

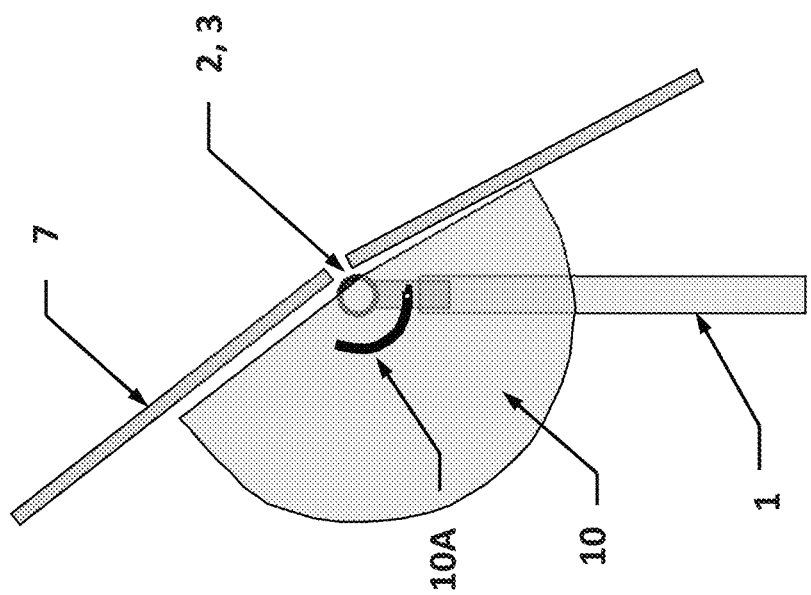
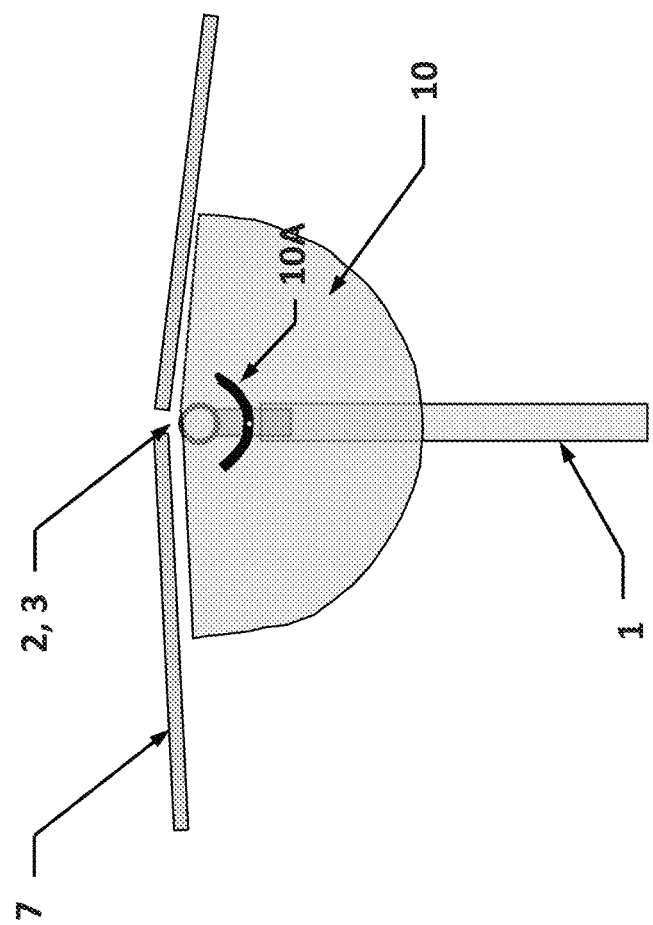
FIG. 11A
FIG. 11B

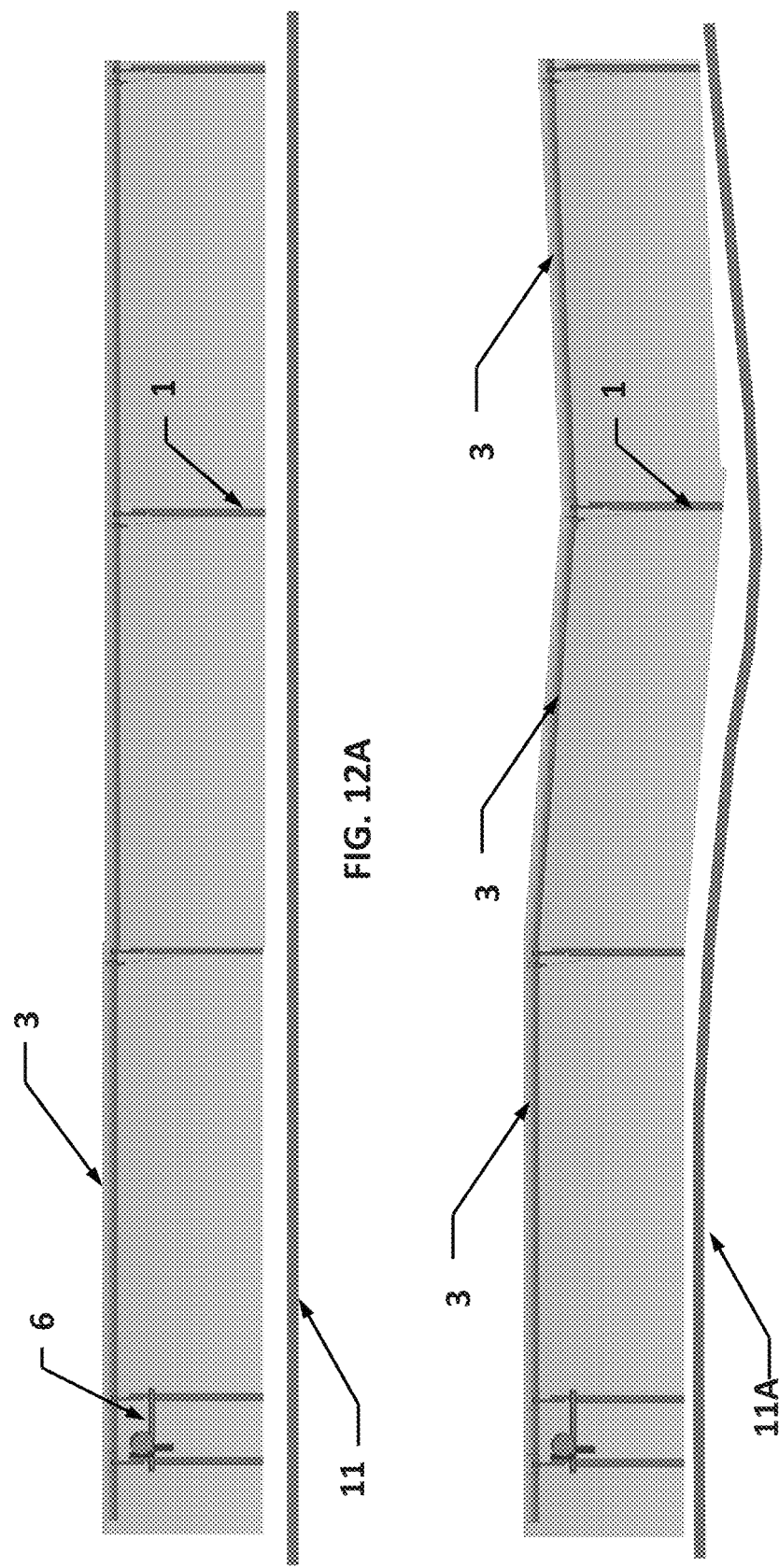

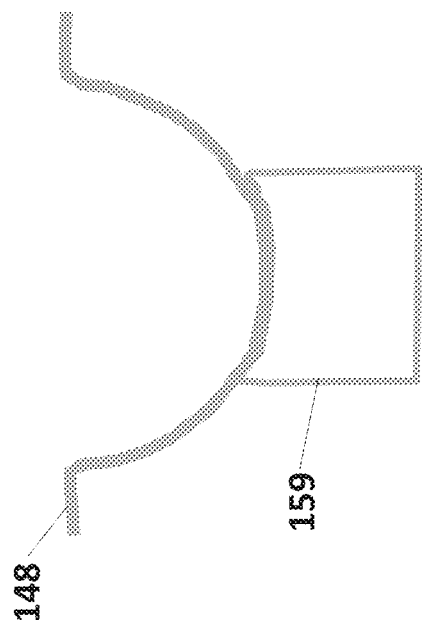
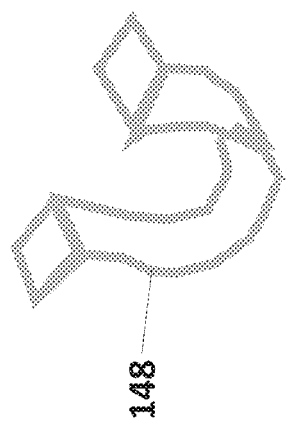
FIG. 16A

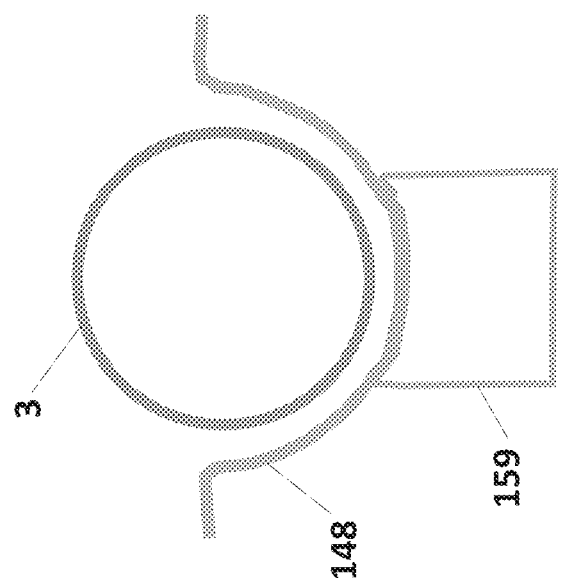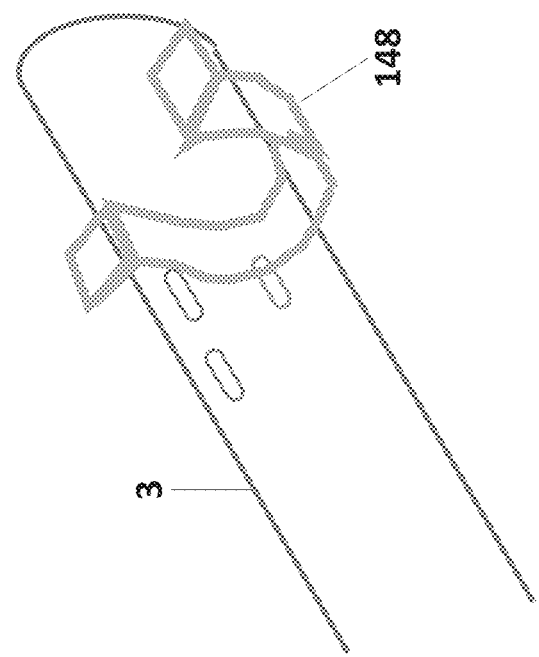
FIG. 16B

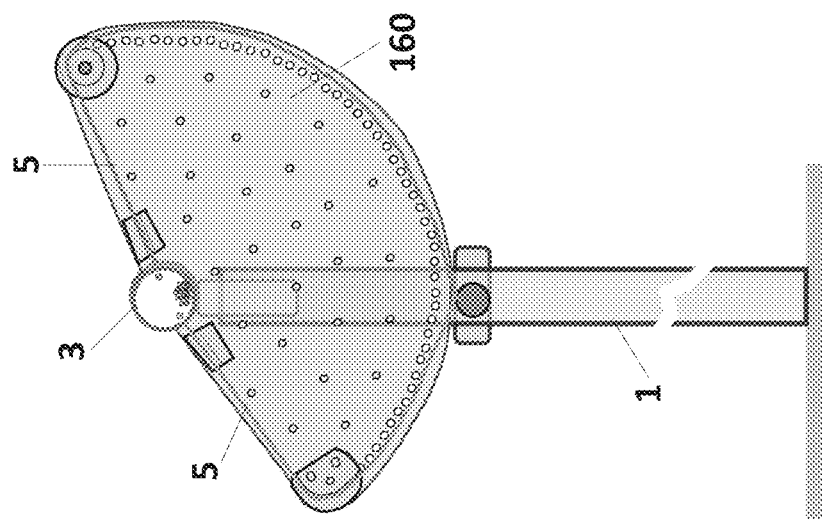
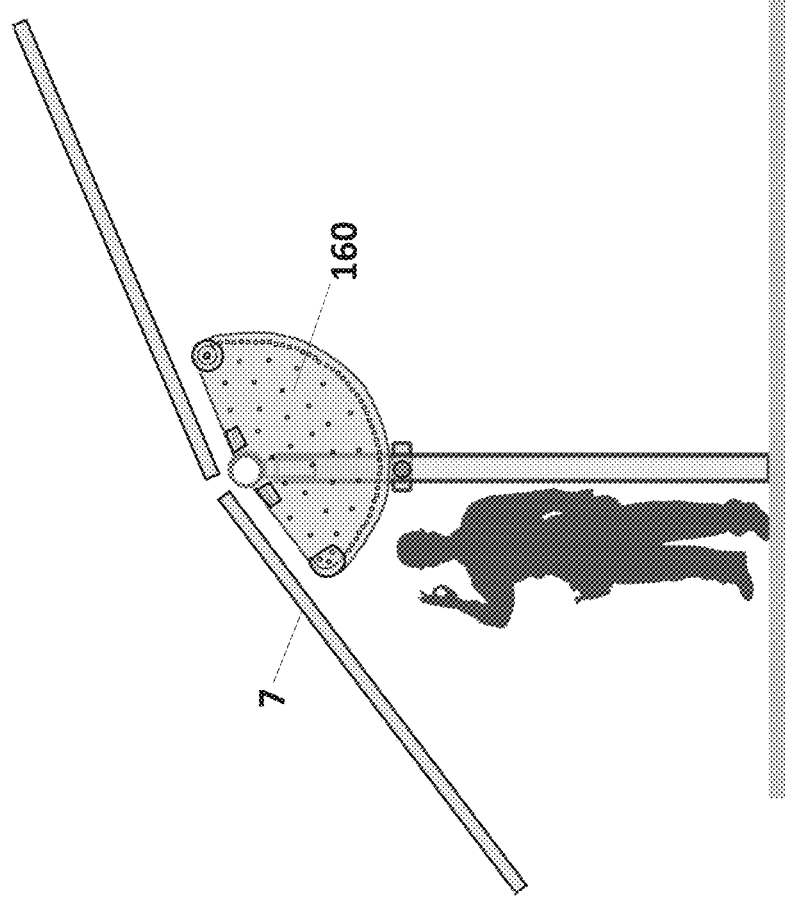
FIG. 21B

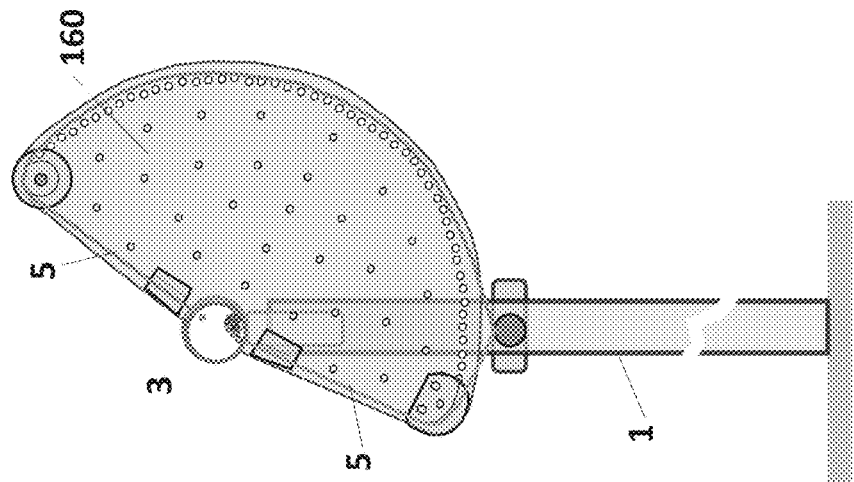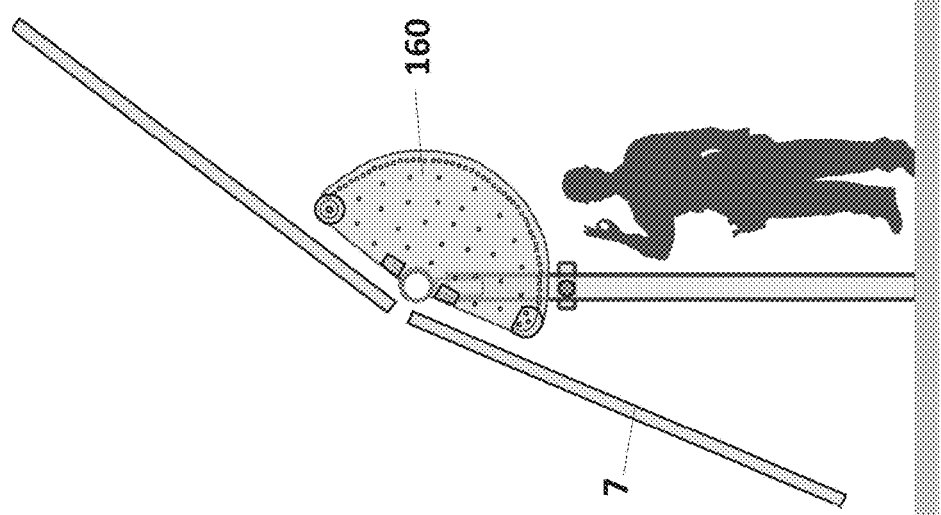
FIG. 21D

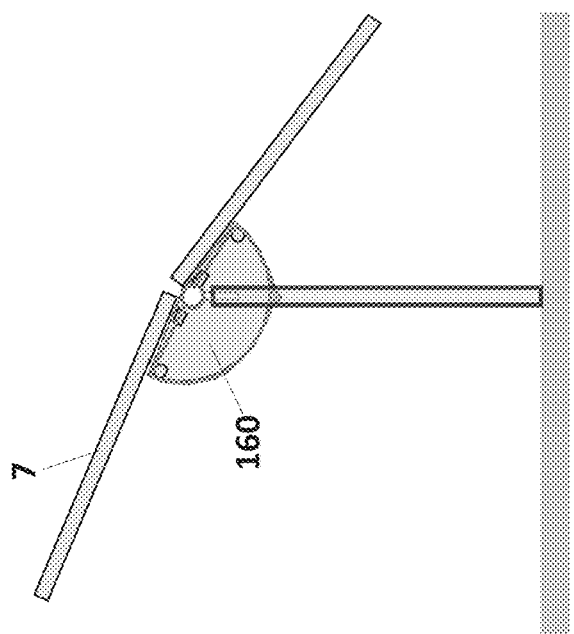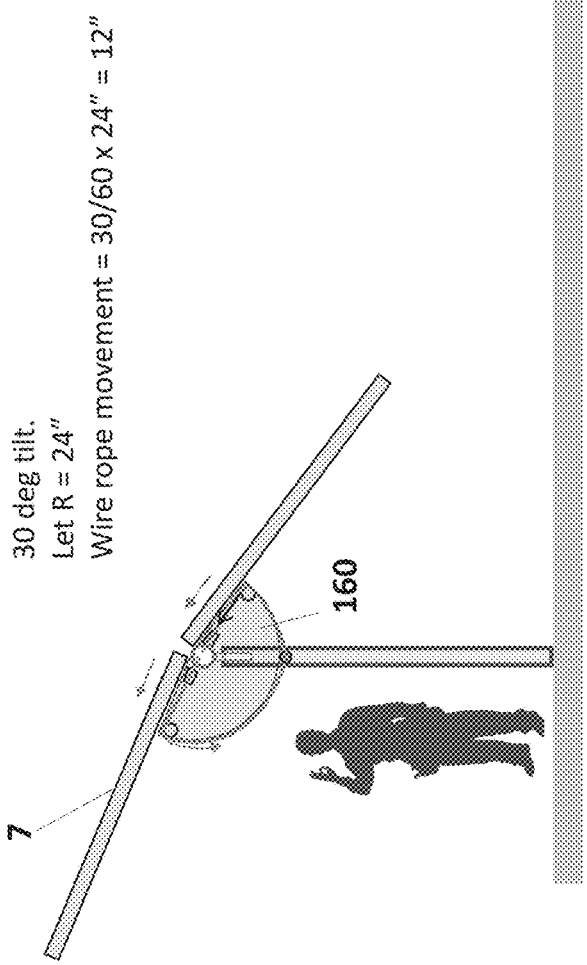
FIG. 22C

DRIVE SYSTEM FOR SINGLE AXIS SOLAR TRACKING

CROSS-REFERENCE TO RELATED APPLICATIONS

This application claims the priority benefit of U.S. Provisional Patent Application Ser. No. 63/417,968, filed Oct. 20, 2022, which is incorporated herein by reference in its entirety.

TECHNICAL FIELD

One or more embodiments relate generally to the control for rotational panels, and in particular, to providing a single axis tracker system using torque tubes as conduits to hold the pull rigging comprising of pull cables and/or pull rods.

BACKGROUND

Single axis trackers are mounting structures used for the controlled movement of photovoltaic solar panels and other solar collecting means from east to west to track the sun daily. A control system must be used to properly track the sun as well as perform back-tracking to prevent rows of solar panels from shading each other early in the morning after sunrise and late in the afternoon as the sun is setting.

SUMMARY OF THE INVENTION

An embodiment for an apparatus for a solar tracker assembly includes a component including multiple pulleys or multiple slide surfaces. A first torque tube is connected with the component. The first torque tube includes a cable slot. A first pull cable is connected to a first and a second pulley of the multiple pulleys or to a first and a second slide surface of the multiple slide surfaces. A second pull cable is connected to a third and a fourth pulley of the multiple pulleys or to a third and a fourth slide surface of the multiple slide surfaces. A first post is connected with the torque tube. The first post includes a connection point connected to the first pull cable and the second pull cable. The first pull cable has a first pull cable section that is disposed within the first torque tube, and the second pull cable has a second pull cable section that is disposed within the first torque tube.

Another embodiment includes a system for a solar tracker assembly that includes a component including multiple pulleys or a plurality of slide surfaces. A first torque tube is connected with the component. The first torque tube includes a cable slot. A second torque tube is connected with the first torque tube. A first pull cable is connected to a first and a second pulley of the multiple pulleys or to a first and a second slide surface of the multiple slide surfaces. A second pull cable is connected to a third and a fourth pulley of the multiple pulleys or to a first and a second slide surface of the multiple slide surfaces. A first post is connected with the first torque tube and the second torque tube. The first post includes a connection point connected to the first pull cable and the second pull cable. The first pull cable has a first pull cable section that is disposed within the first torque tube and the second torque tube, and the second pull cable has a second pull cable section that is disposed within the first torque tube and the second torque tube.

BRIEF DESCRIPTION OF THE DRAWINGS

FIGS. 6A-B show different options for the lever arm, according to some embodiments.

FIGS. 11A-B show movement for the half-pulley that may be used with cables deployed within torque tubes, according to some embodiments.

FIG. 12A shows an example of deployment of a tracker row along a flat ground surface, according to some embodiments.

FIG. 12B shows an example of deployment of a tracker row along an undulating ground surface, according to some embodiments.

FIGS. 16A-K show components for a journal-coupler, with slots, for coupling torque tubes, with slots, with one another and the progression of assembling a single axis tracker system, according to some embodiments.

FIGS. 21A-D show the half-pulley coupled to a torque tube and pier in progression of solar panel angles tilted to the left (counterclockwise), according to some embodiments.

FIGS. 22A-E show the half-pulley coupled to a torque tube and pier in progression of solar panel angles tilted to the right (clockwise), according to some embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to the control for rotational panels, and in particular, to providing a single axis tracker system using torque tubes as pulling cable conduits. One embodiment includes a component including multiple pulleys or multiple slide surfaces. A first torque tube is connected with the component. The first torque tube includes a cable slot. A first pull cable is connected to a first and a second pulley of the multiple pulleys or to a first and a second slide surface of the multiple slide surfaces. A second pull cable is connected to a third and a fourth pulley of the multiple pulleys or to a third and a fourth slide surface of the multiple slide surfaces. A first post is connected with the torque tube. The first post includes a connection point connected to the first pull cable and the second pull cable. The first pull cable has a first pull cable section that is disposed within the first torque tube, and the second pull cable has a second pull cable section that is disposed within the first torque tube.

Figure 1:
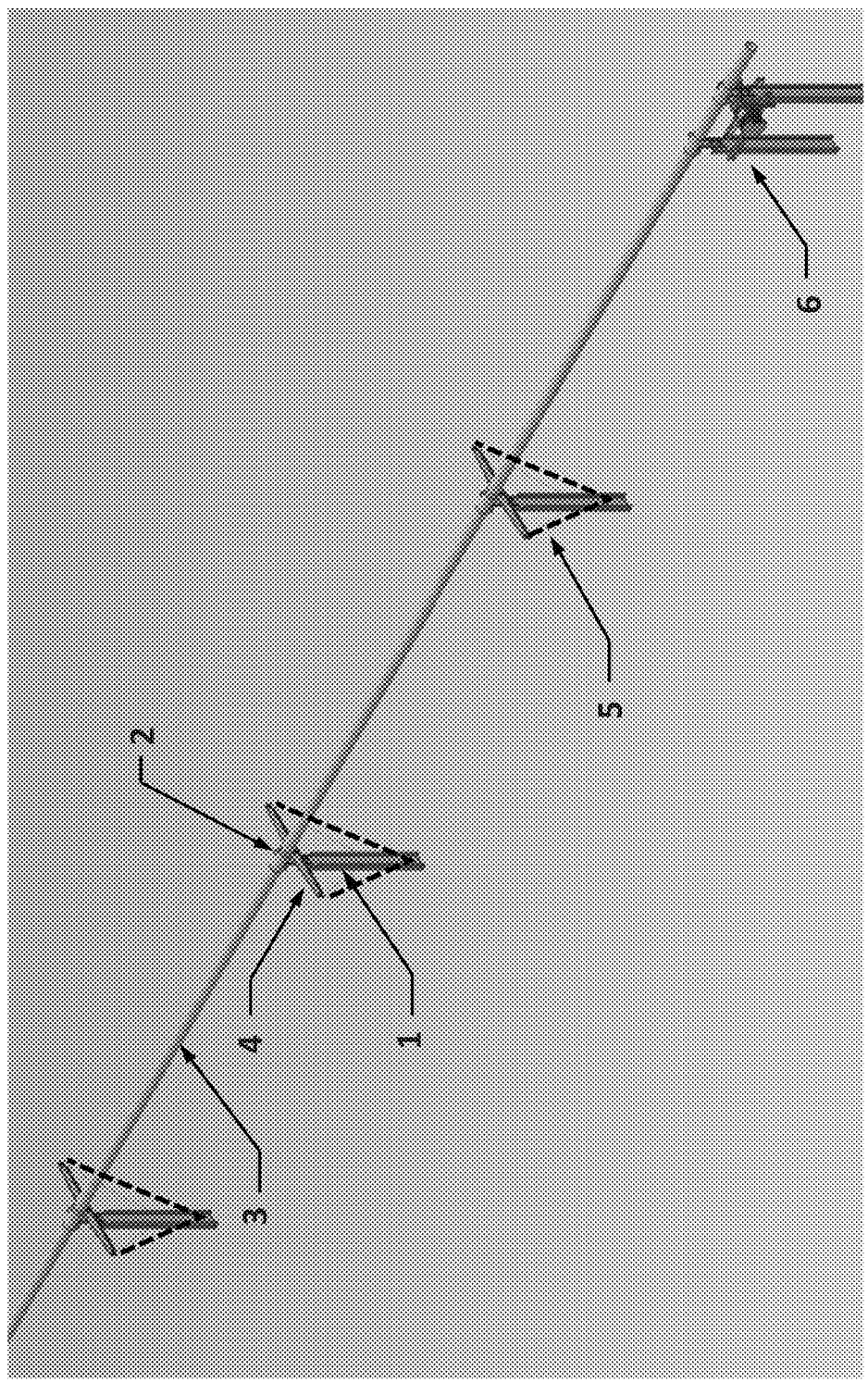
FIG. 1 shows a tracker row, according to some embodiments.

FIG. 1 shows a tracker row, according to some embodiments. One or more embodiments, the tracker rows include posts (or legs) 1, bearings 2, either a torque tube 3 for mounting solar modules or a rocker arm that supports a set of parallel rails used as a table onto which solar modules are mounted, lever arms 4 that are connected to the torque tube 3 (or the rocker arm in the case of parallel rails) near the post 1 and bearing 2, and a pair of pull cables 5. In some embodiments, a bearing 2 is disposed at the top of each post 1 for journaling between a tilt in one direction to a tilt in the opposite direction, generally east to west. In one or more embodiments, the pair of pull cables 5 that are deployed near each post 1, connect the end of the lever arm 4 to the post 1 via a hard connection at the post 1 and a slip connection (e.g., a pulley, a slide eyelet, a guide block, etc.) is disposed at the end of the lever arm 4. The pull cables 5 are pulled by a mechanical drive 6 such as a slew drive with wire drums behaving as a winch, a pair of linear actuators pulling and releasing the two pull cables in coordination to journal the solar array between east and west tilts, etc.

In some embodiments, the pull cables 5 may be connected to two final pull cables for ease of wrapping and pulling by a wire rope drum on a slew drive 6, a pair of linear actuators, or any other common cable pull system. In one or more embodiments, the pull cables 5 may be fed internally within the round torque tube for ease of containment, to support and prevent centenaries, to protect from the elements and in order to maintain lubrication, if needed such as grease.

Figure 2:
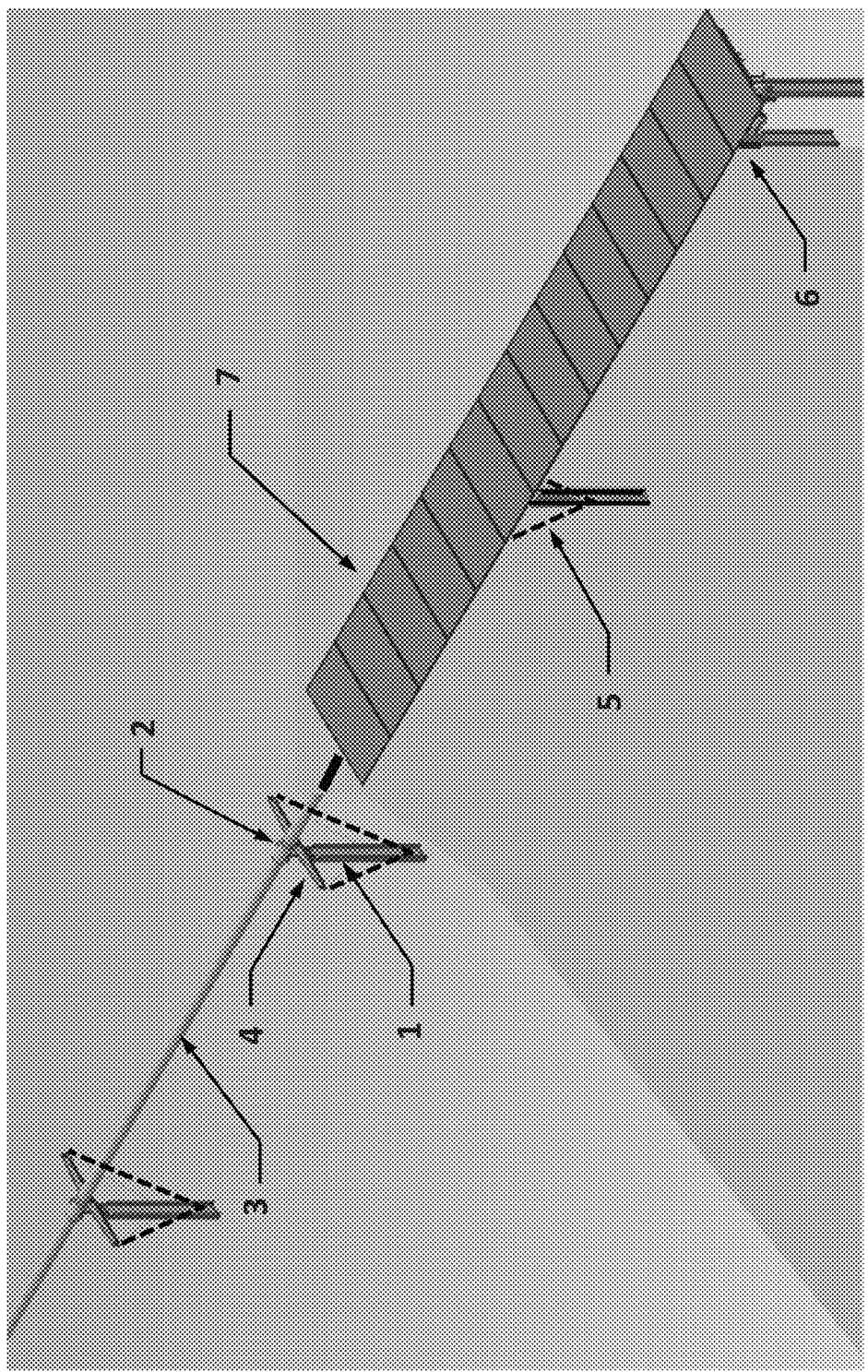
FIG. 2 shows a tracker row mounted with solar panels, according to some embodiments.

FIG. 2 shows a tracker row mounted with solar panels 7, according to some embodiments. In some embodiments, the solar panels 7 may be conventional solar panels.

Figure 3:
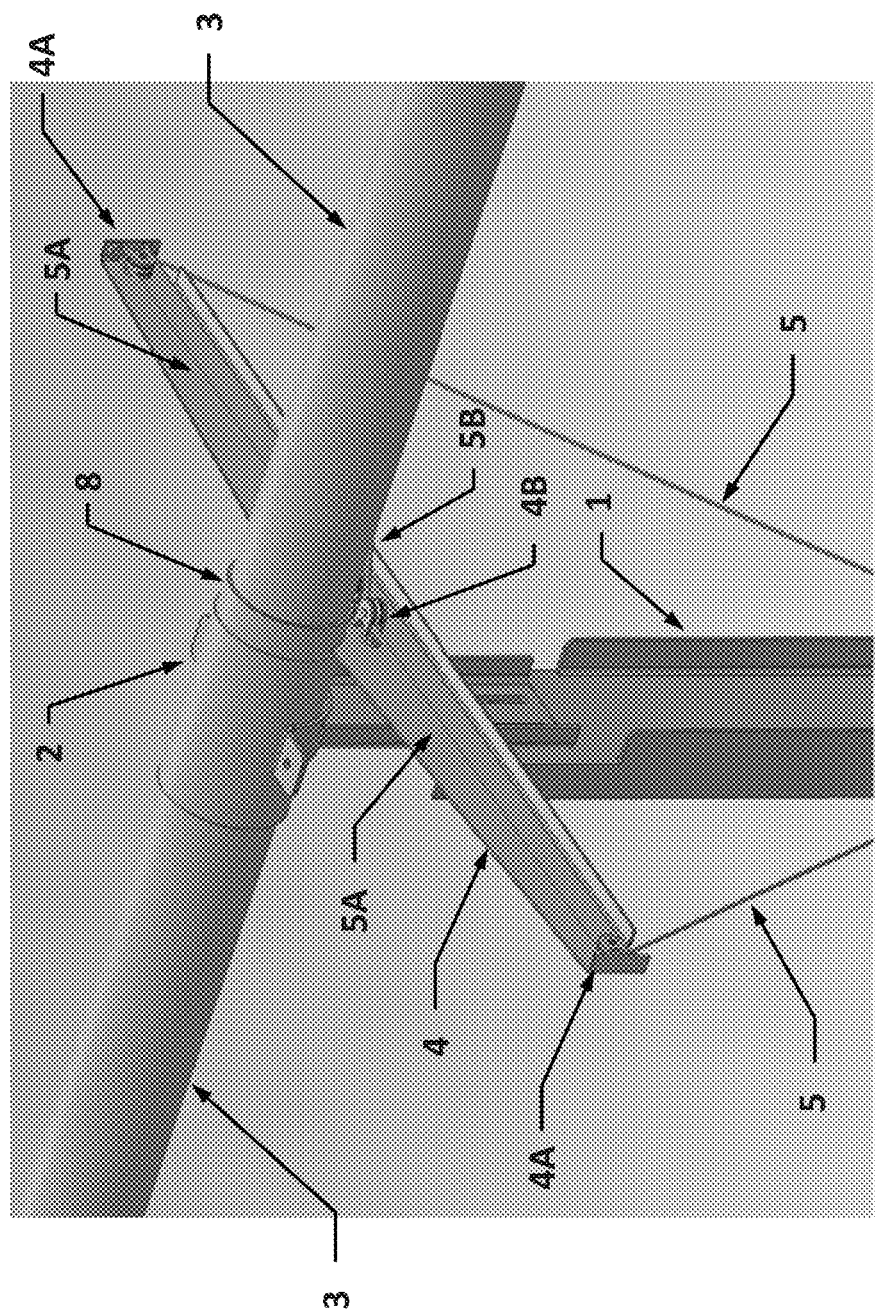
FIG. 3 shows a view of a lever arm for a tracker assembly, according to some embodiments.

FIG. 3 shows a view of a lever arm 4 for a tracker assembly, according to some embodiments. In one or more embodiments, a post 1 is connected with the bearing 2, the torque tubes 3 and the lever arm 4, which may be attached to either the torque tube 3 or the bearing journal 2 with a clamp 8, or by factory or field welding. The path of the pull cables 5, section 5A extends between the end portion at pulley 4A of the lever arm 4 and the middle portion at pulley 4B, and then traverses section 5B along or inside the torque tube 3. In some embodiments, each of the ends of the lever arm 4 has a pulley 4A. In one or more embodiments, a rubbing turning radius is employed to retain and redirect the cable sections 5, 5A. Similarly, the canter of the lever arm 4 has a pulley 4B. In some embodiments, a rubbing turning radius is employed to retain and redirect the cable sections 5A, 5B along the length of, or inside of the torque tube 3.

Figure 4:
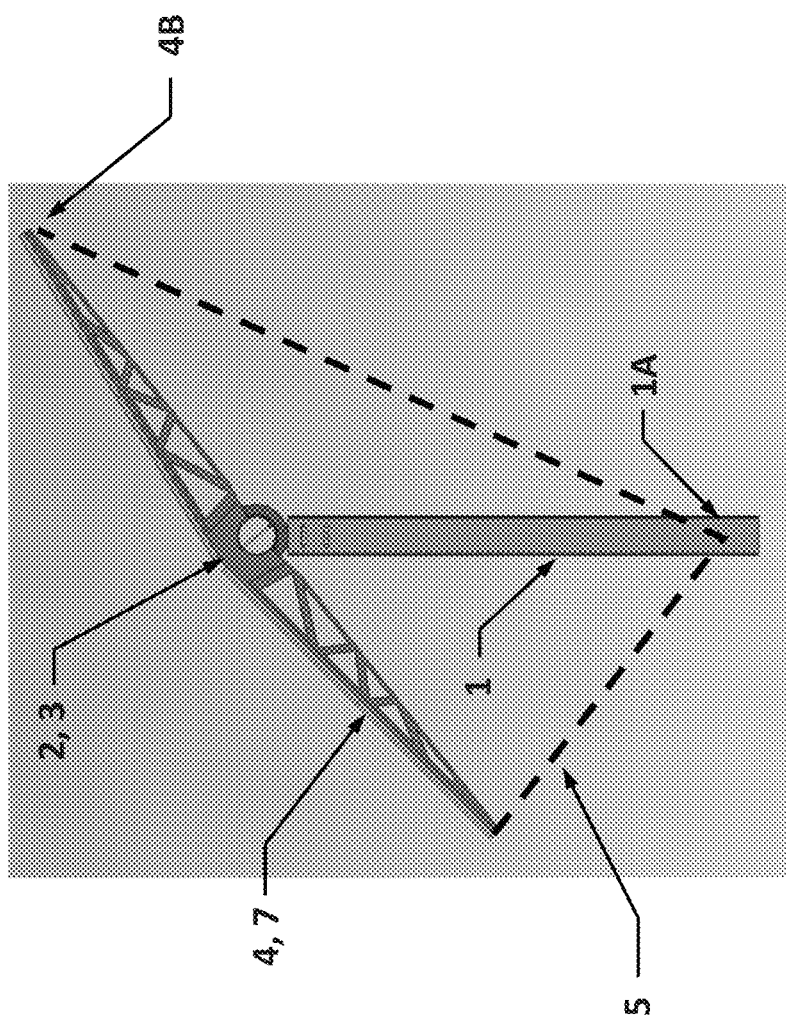
FIG. 4 shows a side view of a tracker at an angle that is tilted via a pulling of one cable from a motorized driver, according to some embodiments.

FIG. 4 shows a side view of a tracker at an angle that is tilted via a pulling of one cable 5 from a motorized driver, according to some embodiments. As shown, the tracker is shown viewing from the south with the solar panels 7 tilted east to the left, with the pull cables 5 pulled in on the east side (left) and let out on the right, or west side.

Figure 5:
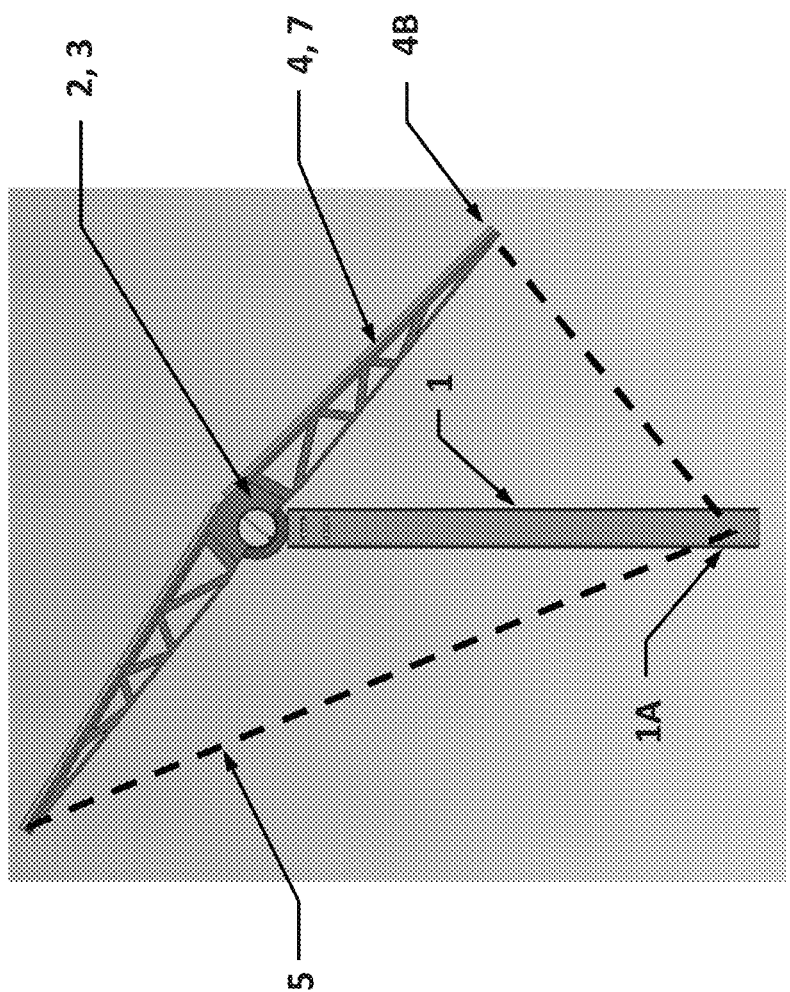
FIG. 5 shows a side view of a tracker at an angle that is tilted via a pulling of another cable from a motorized driver, according to some embodiments.

FIG. 5 shows a side view of a tracker at an angle that is tilted via a pulling of another cable 5 from a motorized driver, according to some embodiments. As shown, the tracker is shown viewing from the south with the solar panels 7 tilted west to the right, with the pull cables 5 pulled in on the west side (right) and let out on the left, or east side.

FIGS. 6A-B show different options for the lever arm 4, according to some embodiments. As shown in both FIGS. 6A-B, the tracker is viewed looking south with two different configurations of the lever arm 4. FIG. 6A shows a lever arm 4 that may be about as wide as the solar panels 7, and placed on top of, or to the sides of the torque tube 3. FIG. 6B shows the lever arm 4 shorter than that shown in FIG. 6A and sitting on the bottom side of the torque tube 3 with the pull cables 5 connected farther up the post 1. In some embodiments, any combination of lever arm 4 placement, length, and connection point 1A (FIG. 4) for the cable 5 to the post 1, as well as location of the cable 5 and section 5A as traversed along the torque tube 3 may be employed.

Figure 7:
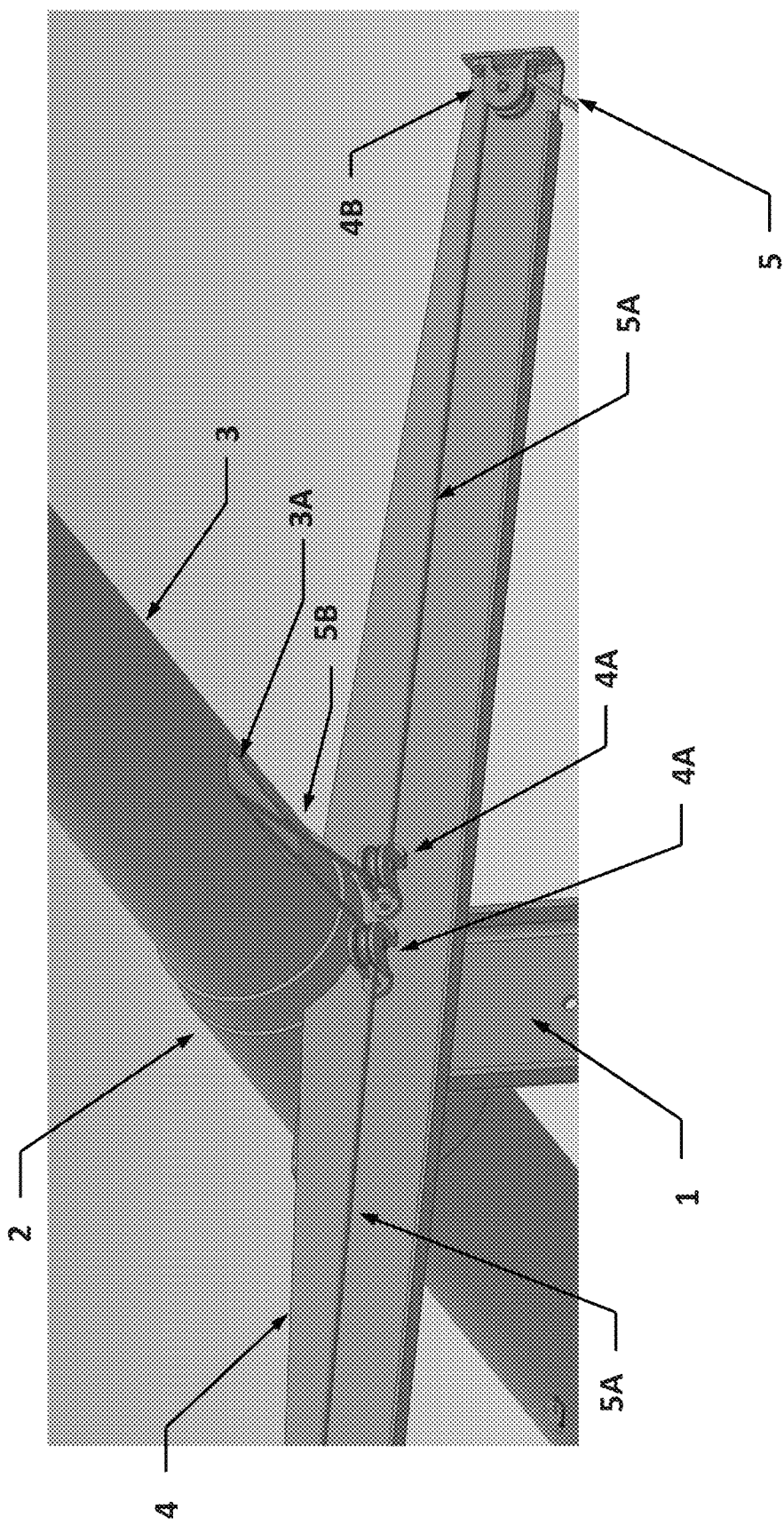
FIG. 7 shows the cables connected with the lever arm where they enter and exit from a torque tube, according to some embodiments.

FIG. 7 shows the cables 5 connected with the lever arm 4 where they enter and exit from a torque tube 3, according to some embodiments. As shown, the view is from underneath at the location of the post 1, the bearing 2 and the lever arm 4, showing the pull cable 5 and sections 5A, 5B and the direction where it turns a radius at the pulleys 4A and 4B. In some embodiments, the pulleys 4A and 4B may be low friction High Density Polyethylene (HDPE) plastic guides or other material on which the cables 5 rub against for cornering. In one or more embodiments, when cable section 5B inside the torque tube 3 is pulled, it pulls on cable section 5A along the length of the lever arm 4 and rounds the corner via the pulley 4B (or HDPE guide). The pull cable section 5B exits the torque tube 3 via a slot 3A in the wall of the torque tube 3. The slot 3A is factory welded with a larger diameter piece of torque tube 3 to maintain the torsional strength in the torque tube 3 at that location. The slot 3A turns with the torque tube 3, guiding the cables 5 including section 5B out to the lever arm 4, which also turns with the torque tube 3. This constant alignment allows the pull cables 5 to be housed inside the torque tube 3.

Figure 8:
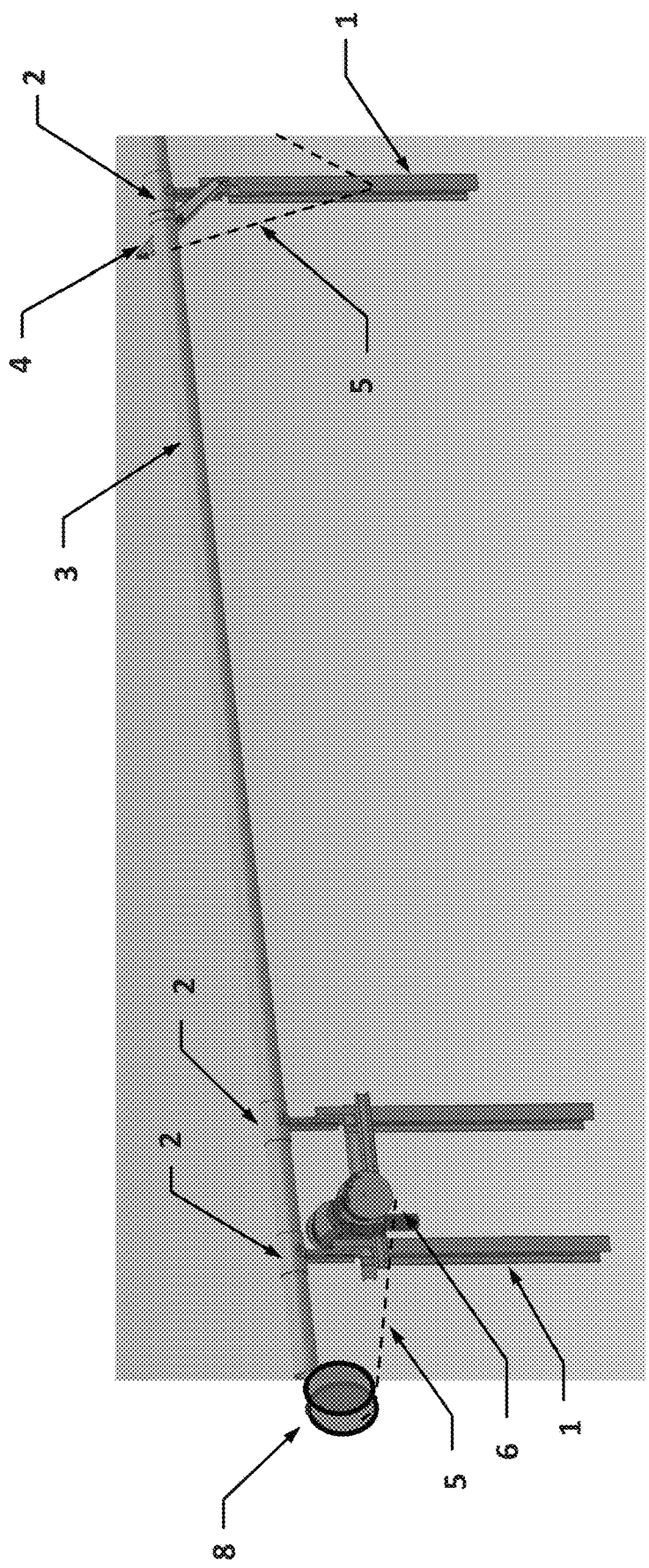
FIG. 8 shows a drive device coupled with cables deployed within torque tubes, according to some embodiments.

FIG. 8 shows a drive device coupled with cables 5 deployed within torque tubes 3, according to some embodiments. As shown, the pull cables 5 are attached to the drive 6, which is attached to the end posts 1, and pulled around two idler pulleys 8 to direct the two pull cables 5 (one for pulling to the east, and one for pulling to the west) into the torque tube 3. The cables 5 traverse down the inside of the torque tube 3 and exit via exit slots 147 (see, e.g., FIG. 14B) in the torque tube 3 near the post 1, bearing 2 and lever arm 4. The drive 6 is shown as a slew drive with two cable (or wire rope) drums. In some embodiments, the drive 6 may be of a different type, such as two independent linear actuators, etc. The idler pulleys 8 are connected to the posts 1.

Figure 9:
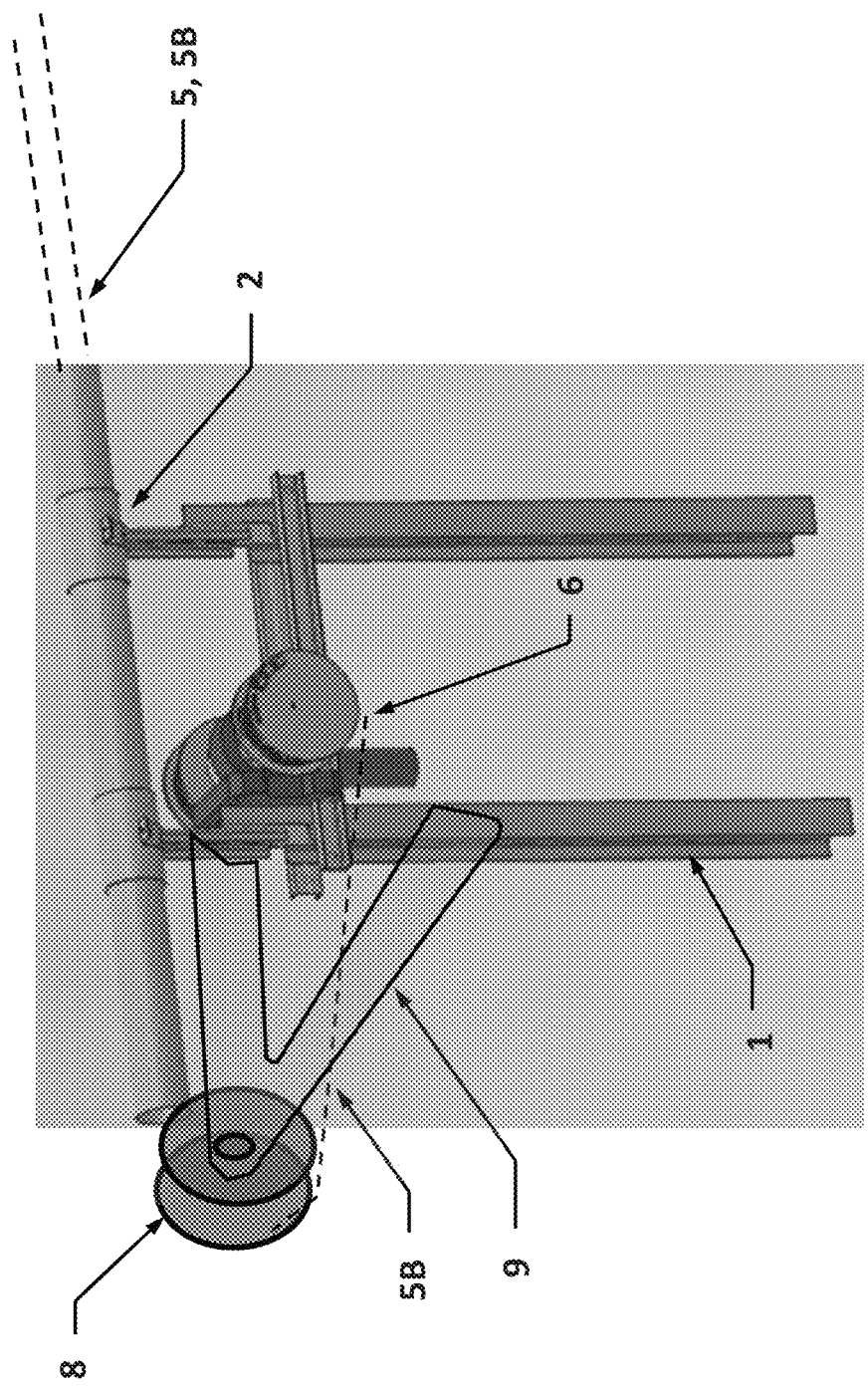
FIG. 9 shows pulleys for the drive device along with an idler pulley coupled with cables deployed within torque tubes, according to some embodiments.

FIG. 9 shows pulleys for the drive device 6 along with an idler pulley 8 coupled with cables 5, 5B deployed within torque tubes, according to some embodiments. In some embodiments, a bracket 9 holds the idler pulleys 8 to the posts 1. The cable 5B traverses from the idler pulleys 8 to the drive 6. The cables 5, 5B traverse down the inside of the torque tube 3.

Figure 10:
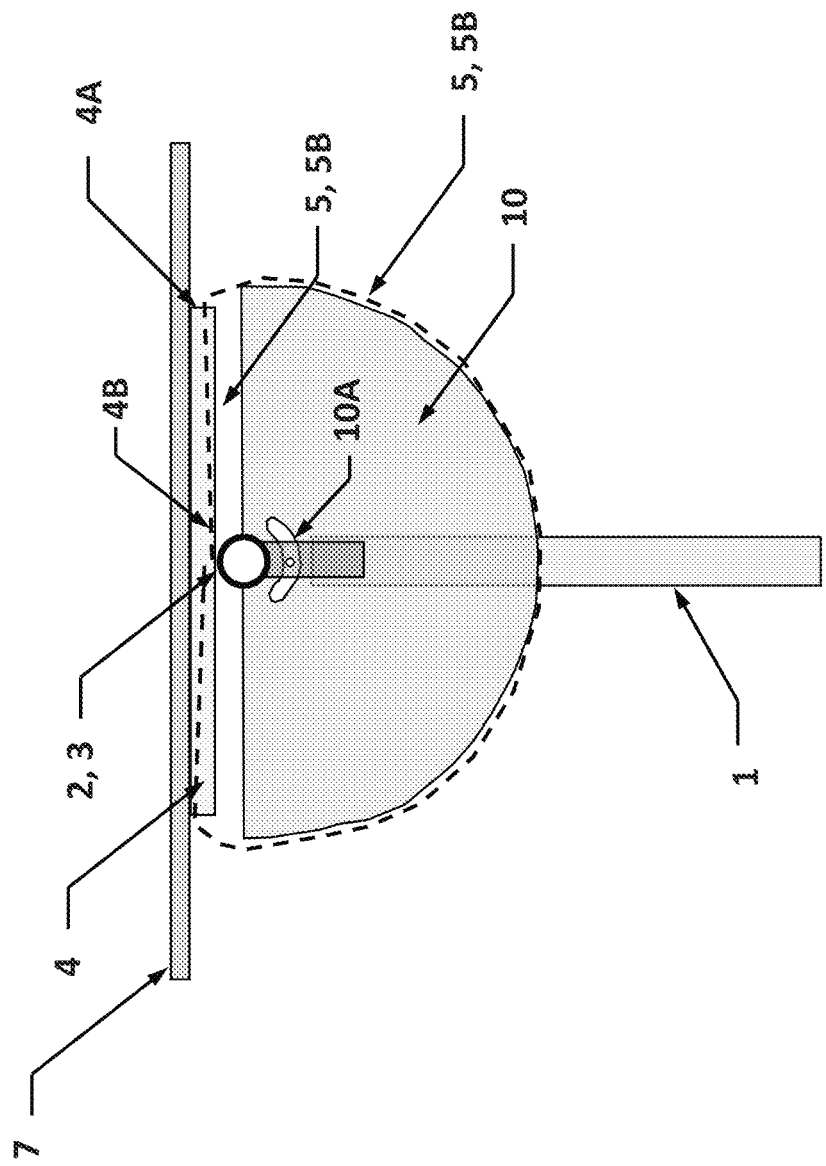
FIG. 10 shows an optional half-pulley that may be used with cables deployed within torque tubes, according to some embodiments.

FIG. 10 shows an optional half-pulley 10 that may be used with cables 5, 5B deployed within torque tubes 3, according to some embodiments. As shown, the view is looking south with the solar panels 7 in the horizontal or flat position. Connected to the torque tube 3 is a half-pulley 10 having a semi-circular radius. The pull cables 5, 5B can slip around the half-pulley 10 that includes an HDPE as a groove and landing for the cables 5, 5B so that a pull force on cable 5 east or west, results in an equal length of release, or let out of the cable 5 on the other side, west or east. This allows the drive 6 to utilize constant diameter cable drums on the slew drive. In one or more embodiments, the cables 5, 5B are directed to a set of pulleys that direct the cable 5 to the bottom of the half-pulley 10 and then feeds into the groove-landing of the half-pulley 10 to pull and turn the half-pulley 10, and hence torque tube 3 without cable 5 slipping or sliding on the surface of the half-pulley 10. The cable 5 may be held underneath the torque tube 3 as well as be fed inside it. The cable 5 needs to traverse underneath the half-pulley 10 or the half-pulley 10 needs a feed-through window (or slot) 10A to allow the cable 5 to pass through the half-pulley 10 and be close to the torque tube 3.

FIGS. 11A-B show movement for the half-pulley 10 that may be used with cables deployed within torque tubes 3, according to some embodiments. The views for FIGS. 11A-B are an elevation view looking south. FIG. 11A shows the position of the pass-through hole when the array is not tilted. FIG. 11B shows a full tilt to the right and demonstrates how the semi-circular window 10A provides for the pull cables 5 to pass through.

FIG. 12A shows an example of deployment of a tracker row along a flat ground surface 11, according to some embodiments. FIG. 12B shows an example of deployment of the tracker row along an undulating ground surface 11A, according to some embodiments. The tracker is at an elevation and FIGS. 12A-B show views looking east or west by which the ground 11 is level, or of one constant slope as shown in FIG. 12A for which the torque tube segments 3 are in a straight line, sharing bearings. FIG. 12B shows the same view but with the ground surface 11A having a variable slope in the north-south direction, requiring the torque tube segments 3 to be disjointed for up-down elevation changes, having their own simple bearings 2 at each post 1, while the pull cables 5, 5B inside the torque tube 3 are able to traverse up and down, contained within the space of the inside diameter of the torque tube 3.

Figure 13:
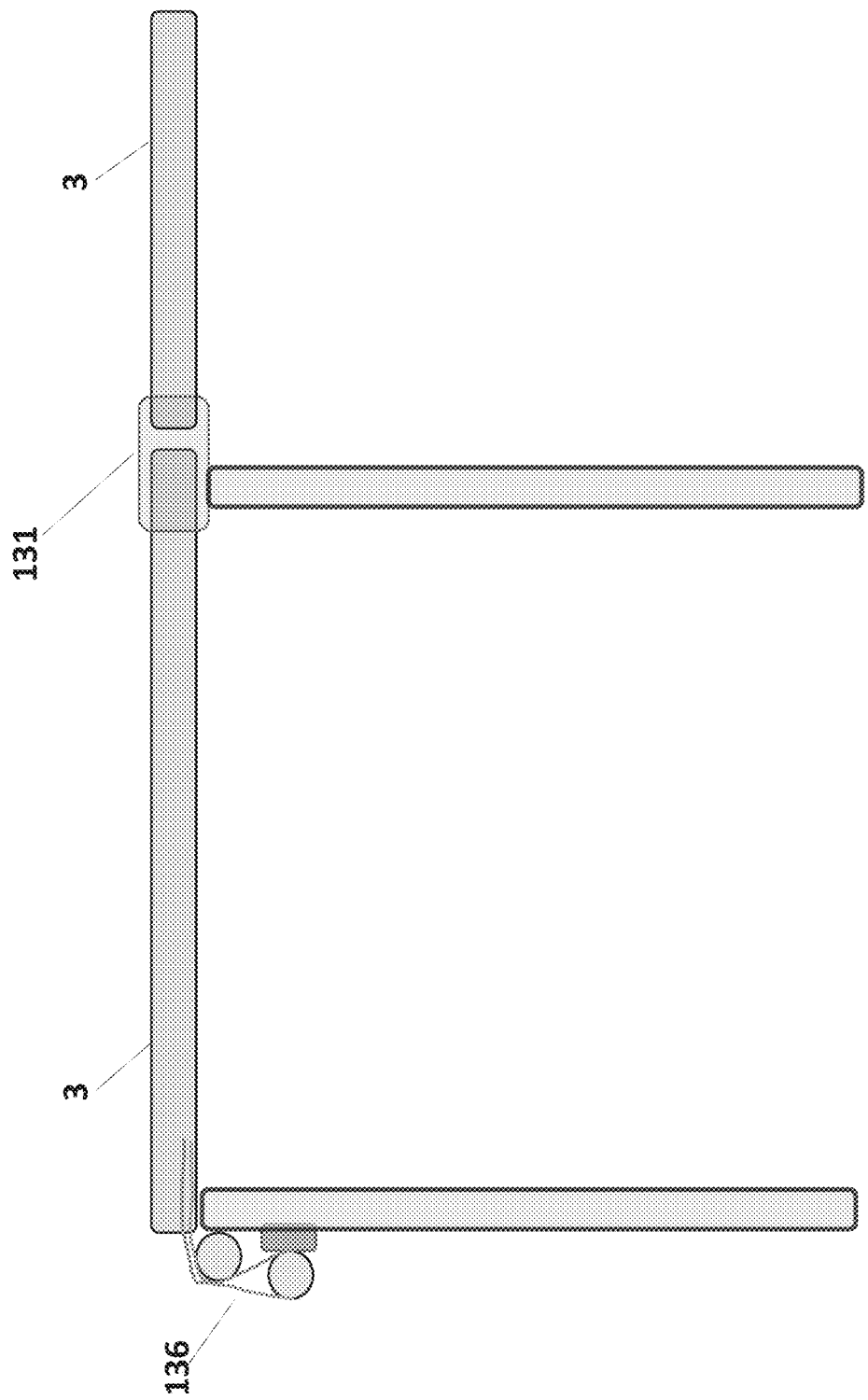
FIG. 13 shows round torque tubes coupled with a journal-coupler and supported on posts, according to some embodiments.

FIG. 13 shows round torque tubes 3 coupled with a journal-coupler 131 and supported on posts, according to some embodiments. In some embodiments, a drive 136 (e.g., a winch slew drive, etc.) includes idler pulleys and feeds east and west pull cables into the bottom of the torque tubes 3. The drive 136 may include cable (or wire rope) drums, either variable diameter or a single diameter (e.g., for half-pulleys 10 (FIG. 10) at each post). In some embodiments, the journal-coupler 131 performs as a journal for a bearing, a coupler for torque tubes, an exit path for tilt-control cables, thru-bolts to assist in coupling, to separate east and west cables, and to provide a lift to a bearings' two exiting pull cables.

Figure 14A:
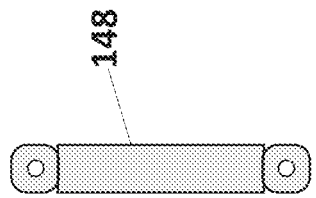
FIGS. 14A-V show a tracker assembly and progression of assembling a single axis tracker system, according to some embodiments.
Figure 14B:
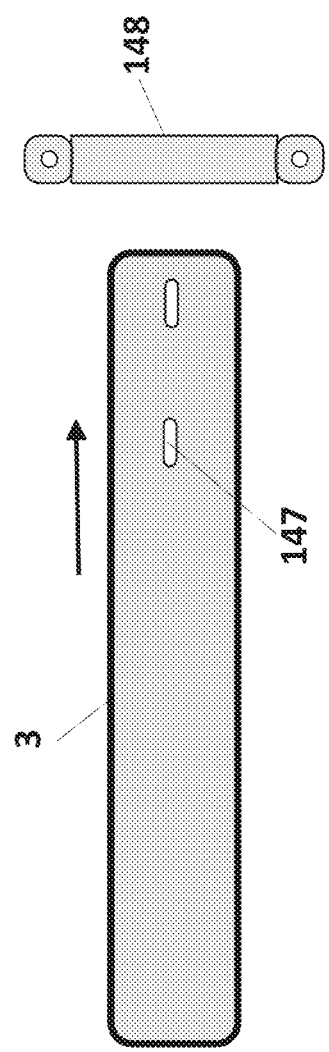
Figure 14C:
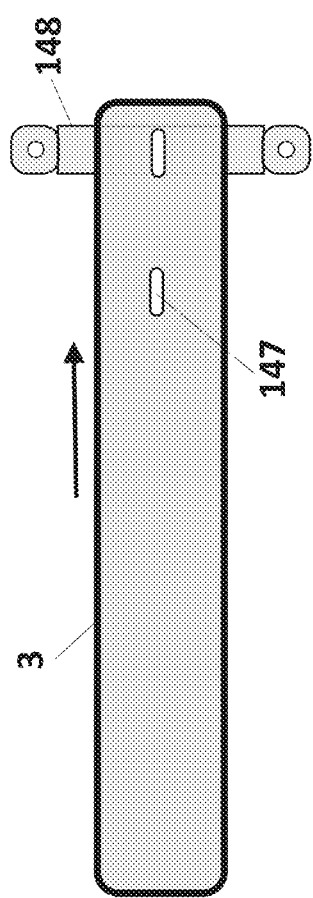
Figure 14D:
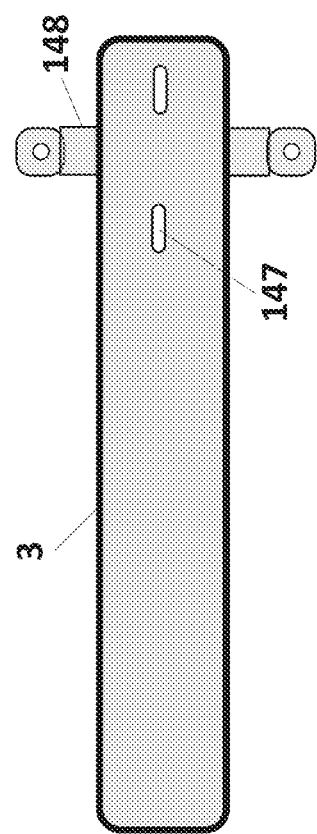
Figure 14E:
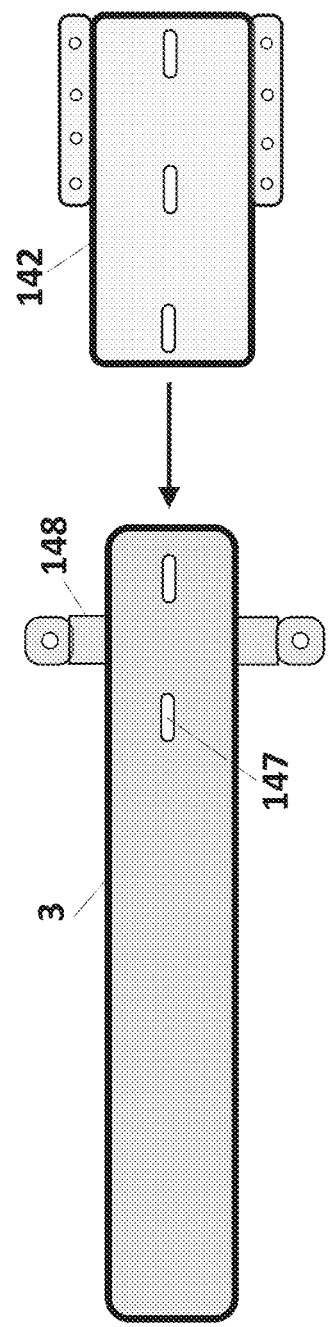
Figure 14F:
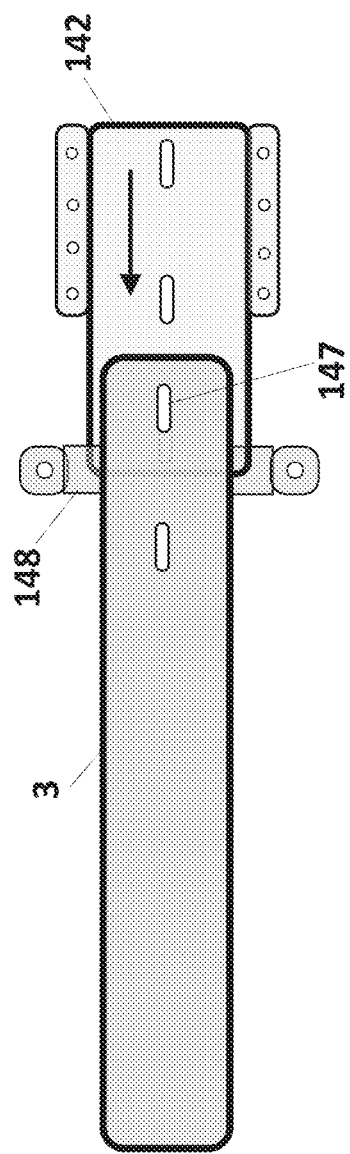
Figure 14G:
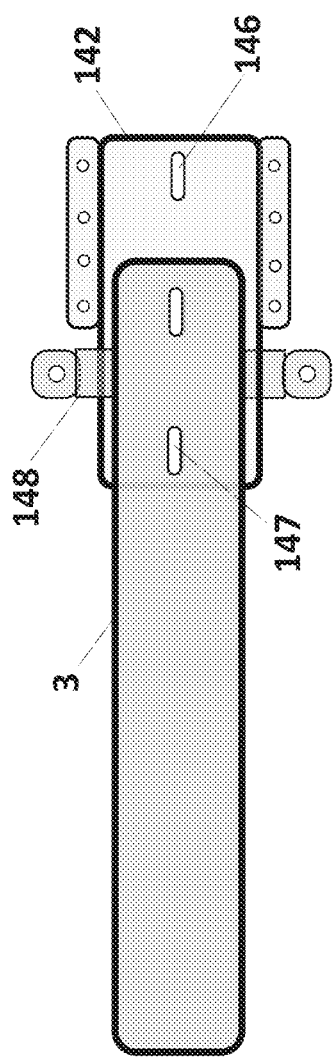
Figure 14H:
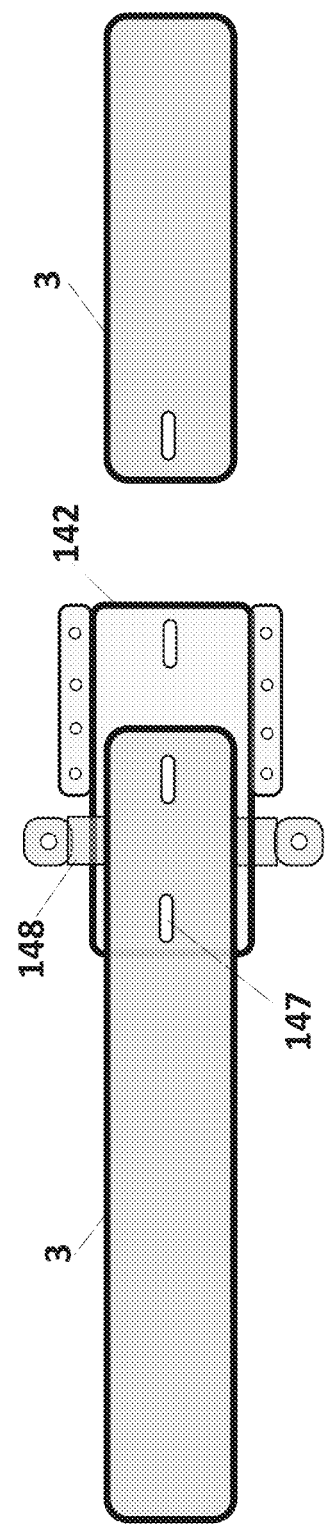
Figure 14I:
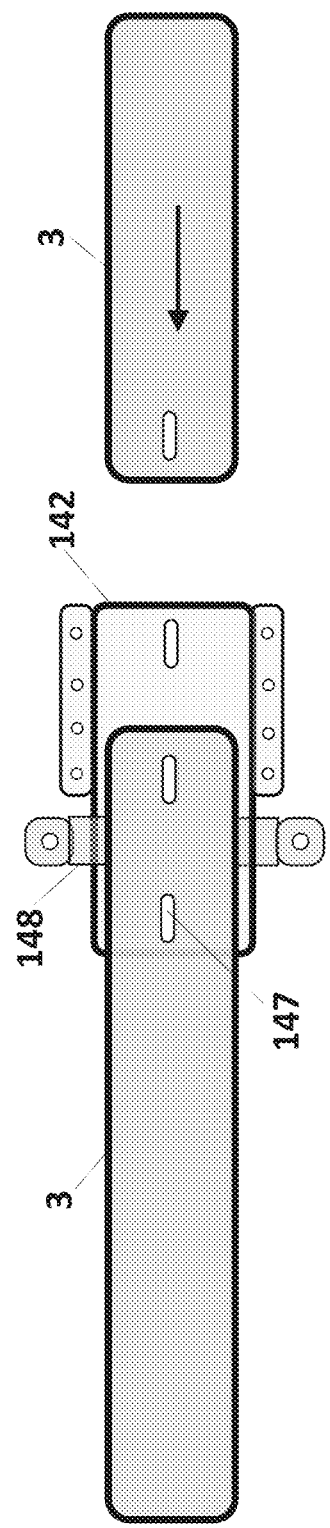
Figure 14J:
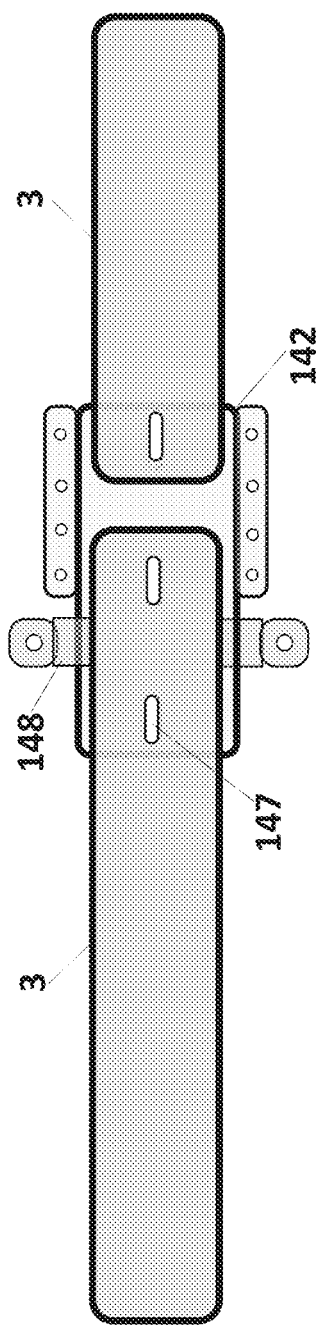
Figure 14K:
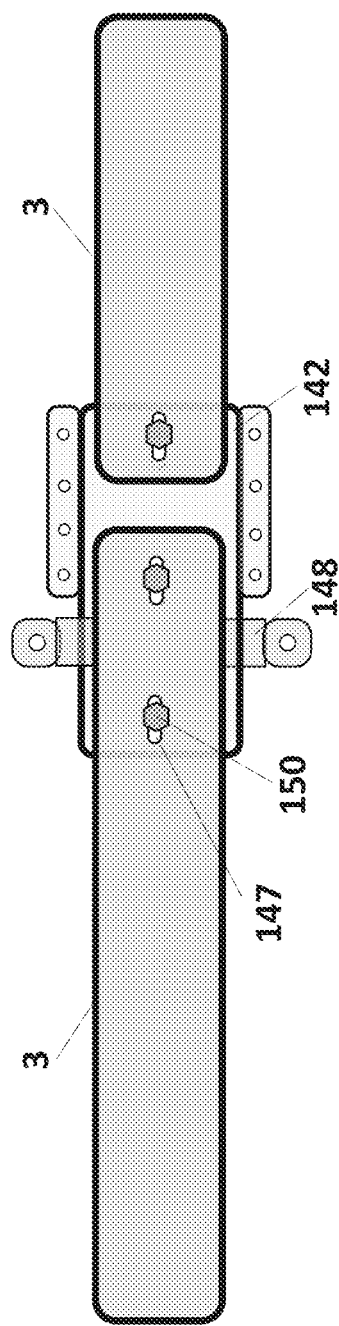
Figure 14L:
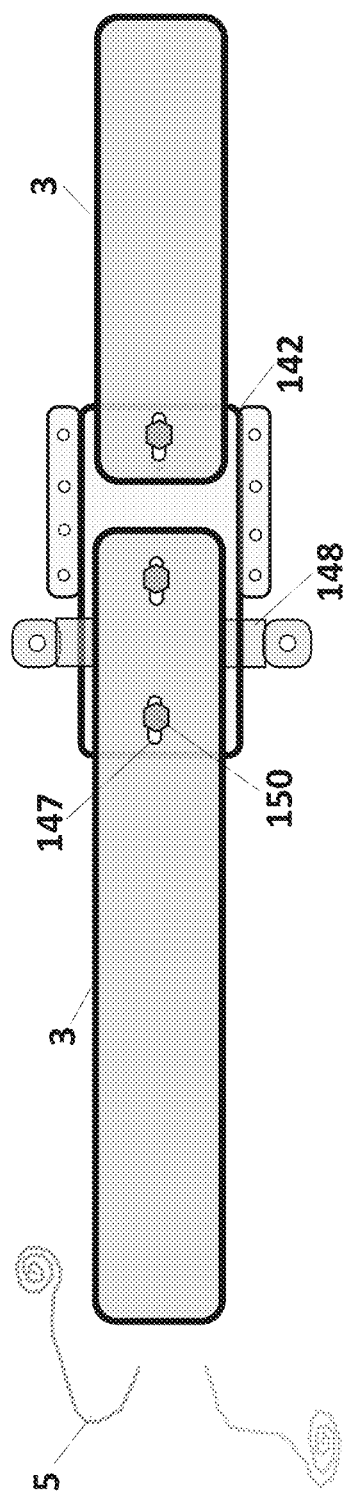
Figure 14M:
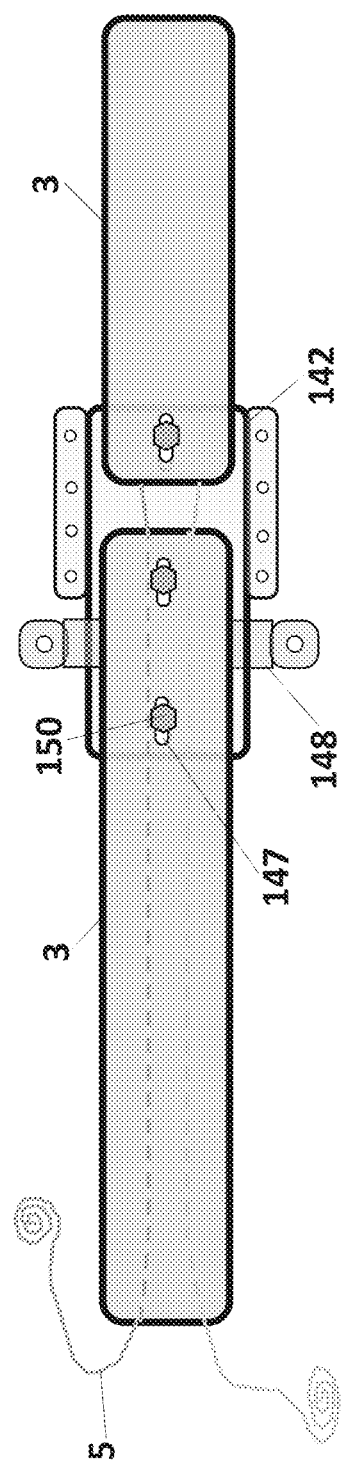
Figure 14N:
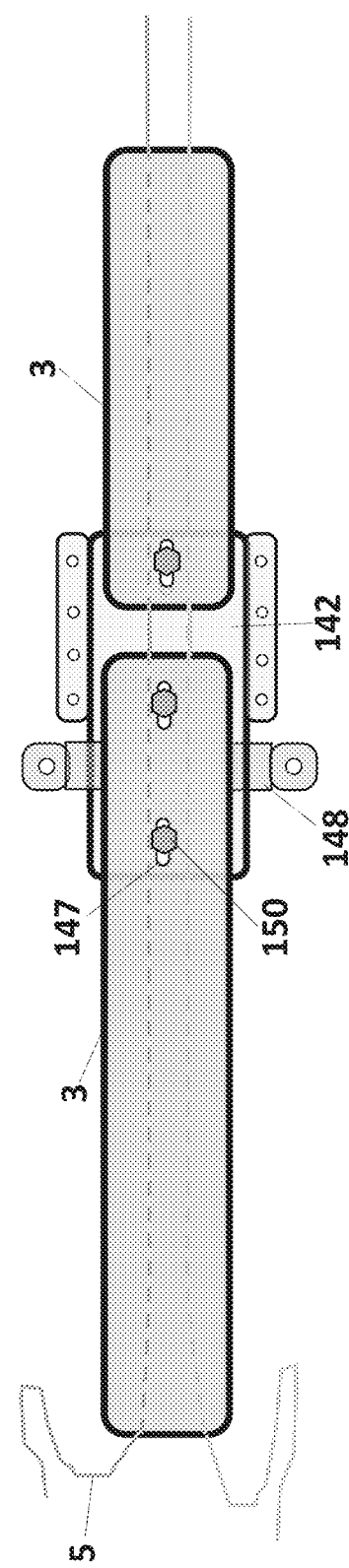
Figure 14O:
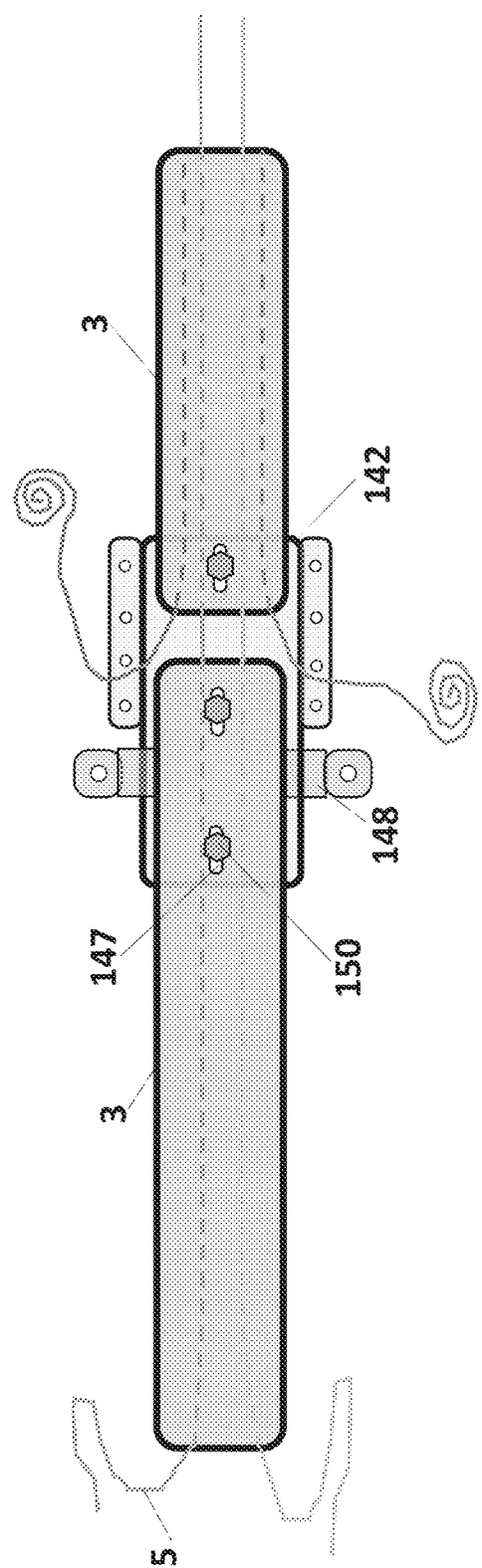
Figure 14P:
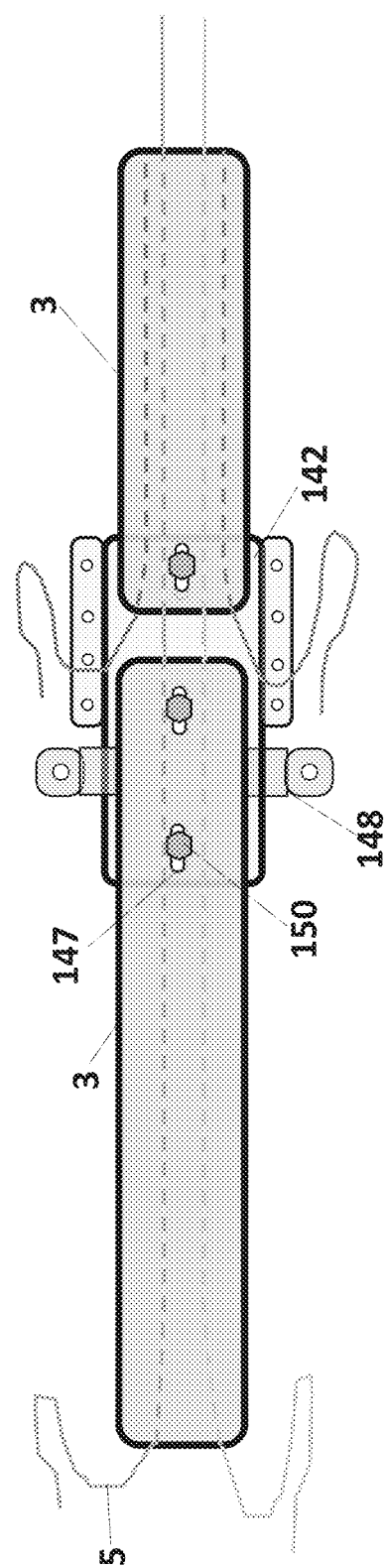
Figure 14Q:
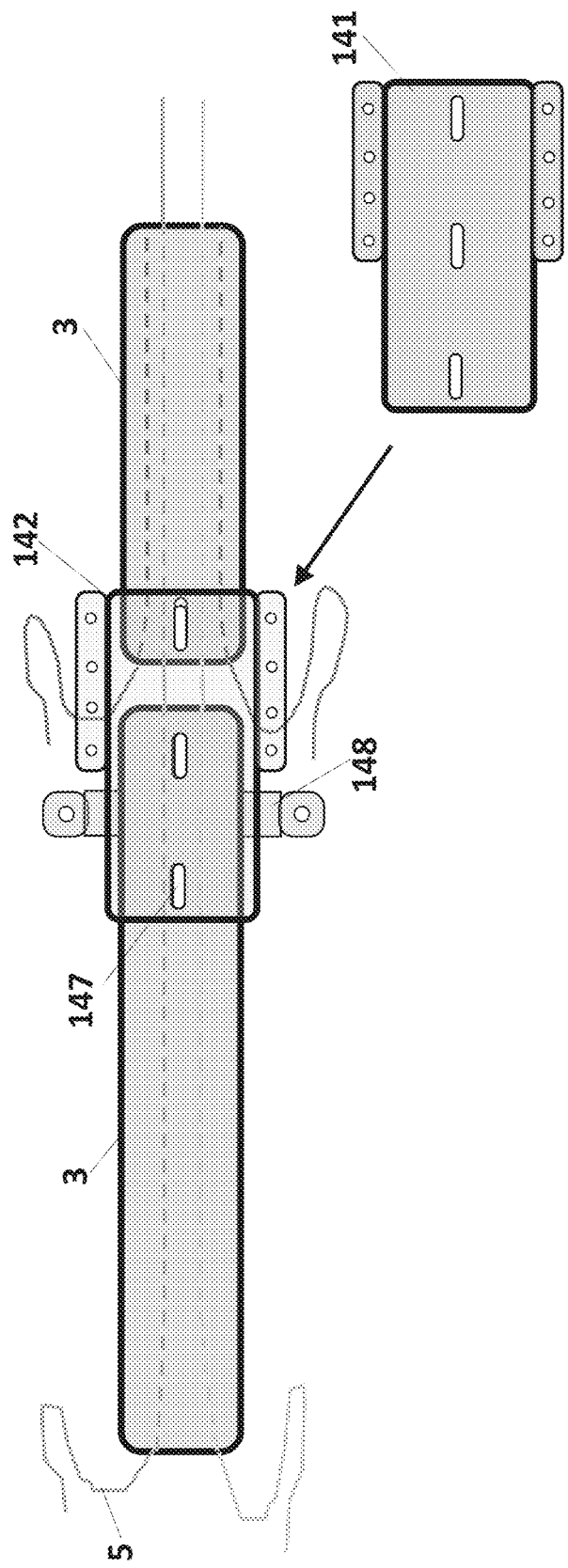
Figure 14R:
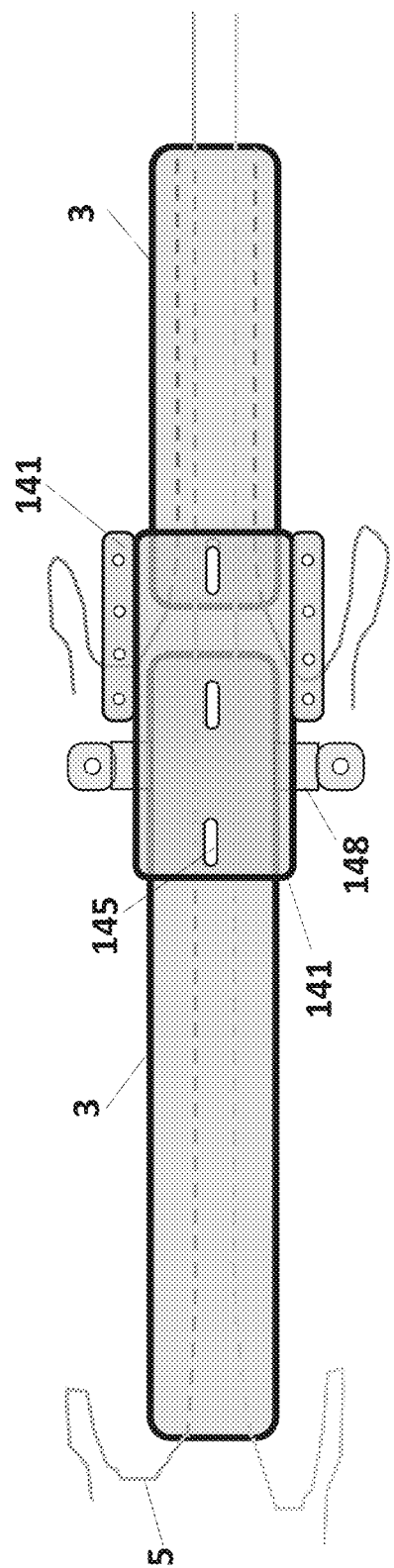
Figure 14S:
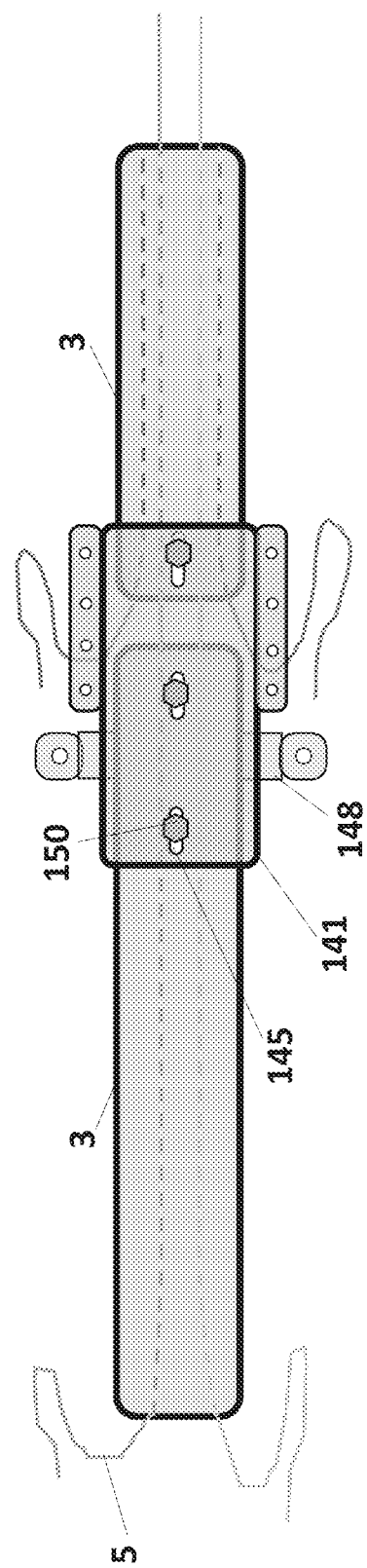
Figure 14T:
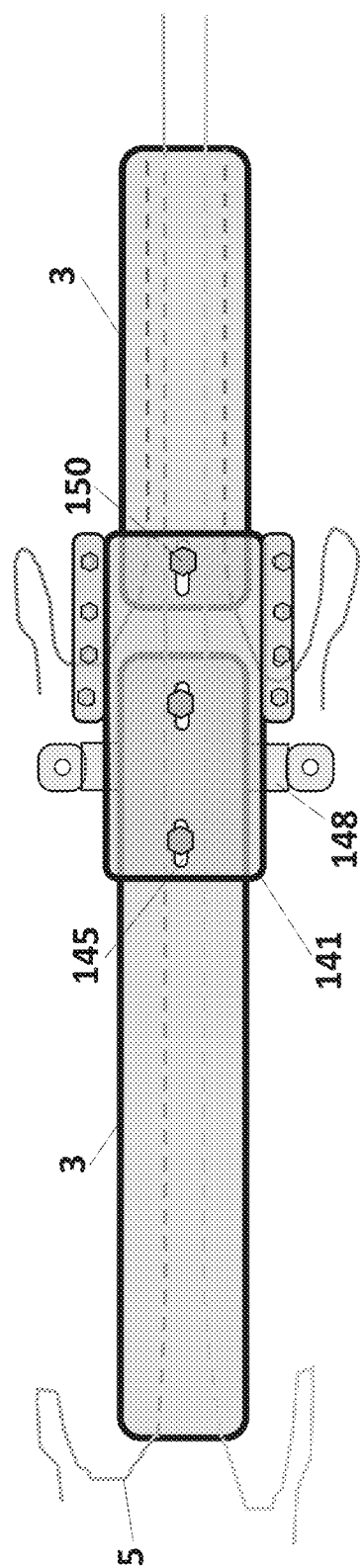
Figure 14U:
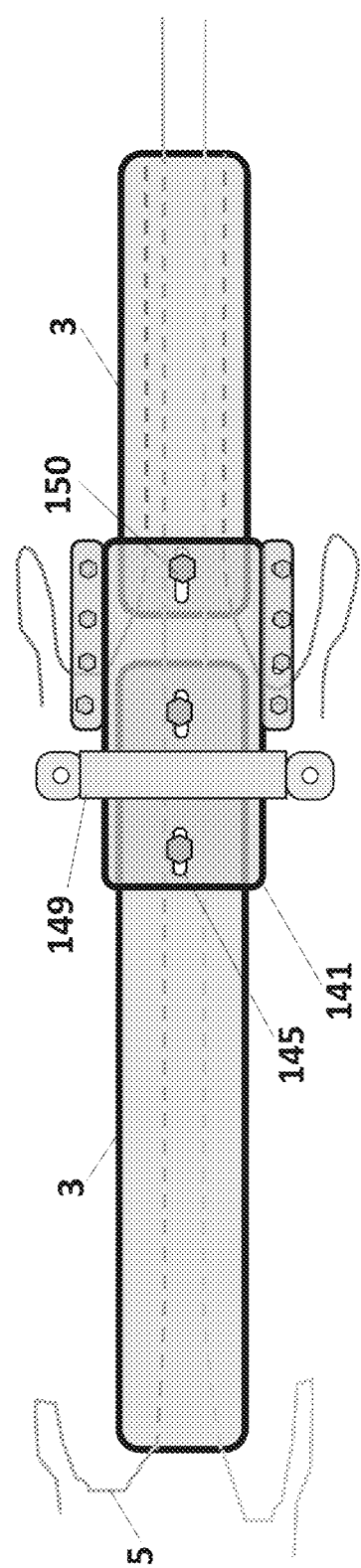
Figure 14V:
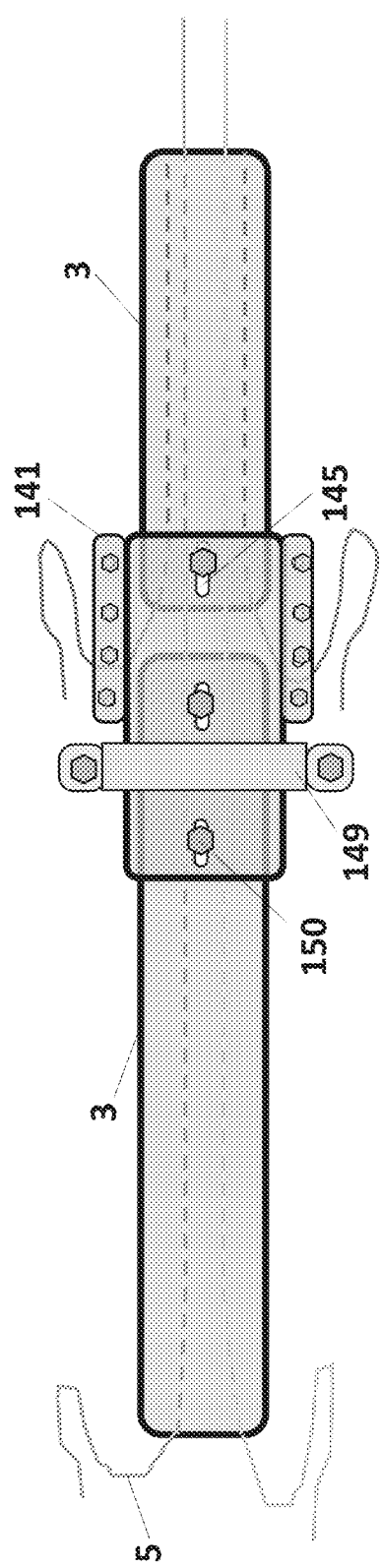

FIGS. 14A-V show a tracker assembly and progression of assembling a single axis tracker system, according to some embodiments. In FIG. 14A, a bottom bearing race 148 is shown. In FIGS. 14B-D, the torque tube 3 with exit slots 147 is placed or laid into the bottom bearing race 148 in the direction of the arrow. In FIGS. 14E-G, the bottom journal-coupler 142 is placed or slid under the torque tube 3 with exit slots 147 in the direction of the arrow, which lines up the exit slots 147 with slots 146 of the bottom journal-coupler 142. In FIGS. 14H-J, another torque tube 3 with exit slots 147 is placed or laid into the bottom bearing race 148 in the direction of the arrow. In FIG. 14K, temporary vertical bolts 150 are placed through the exit slots and slots 146, and tightened by hand (e.g., finger tightened). In FIGS. 14L-P, the cables (or wire ropes) 5 are pulled into the torque tubes 3 (the dashed lines show one possible position within the torque tubes 3 where the two cables 5 are separated from one another by the temporary vertical bolts 150). In FIGS. 14Q-T, the temporary vertical bolts 150 are removed and a top journal-coupler 141 is attached in the direction of the arrow; then the temporary vertical bolts 150 are re-positioned through slot 145 of the top journal-coupled 141. In FIGS. 14U-V, a top bearing race 149 is attached.

Figure 15A:
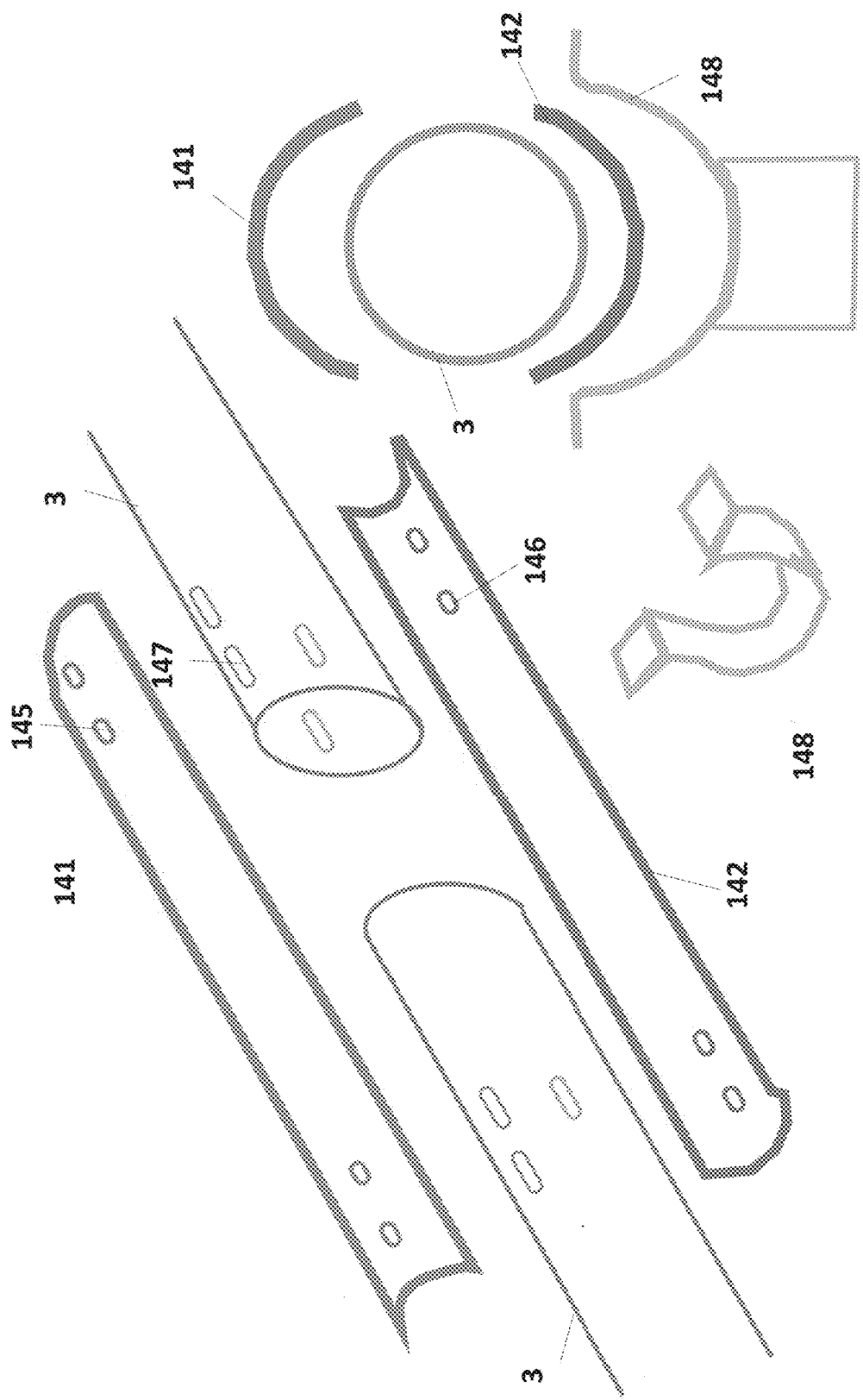
FIGS. 15A-B show exploded views of a journal-coupler, with slots, for coupling torque tubes, with slots, with one another using the slots, according to some embodiments.
Figure 15B:
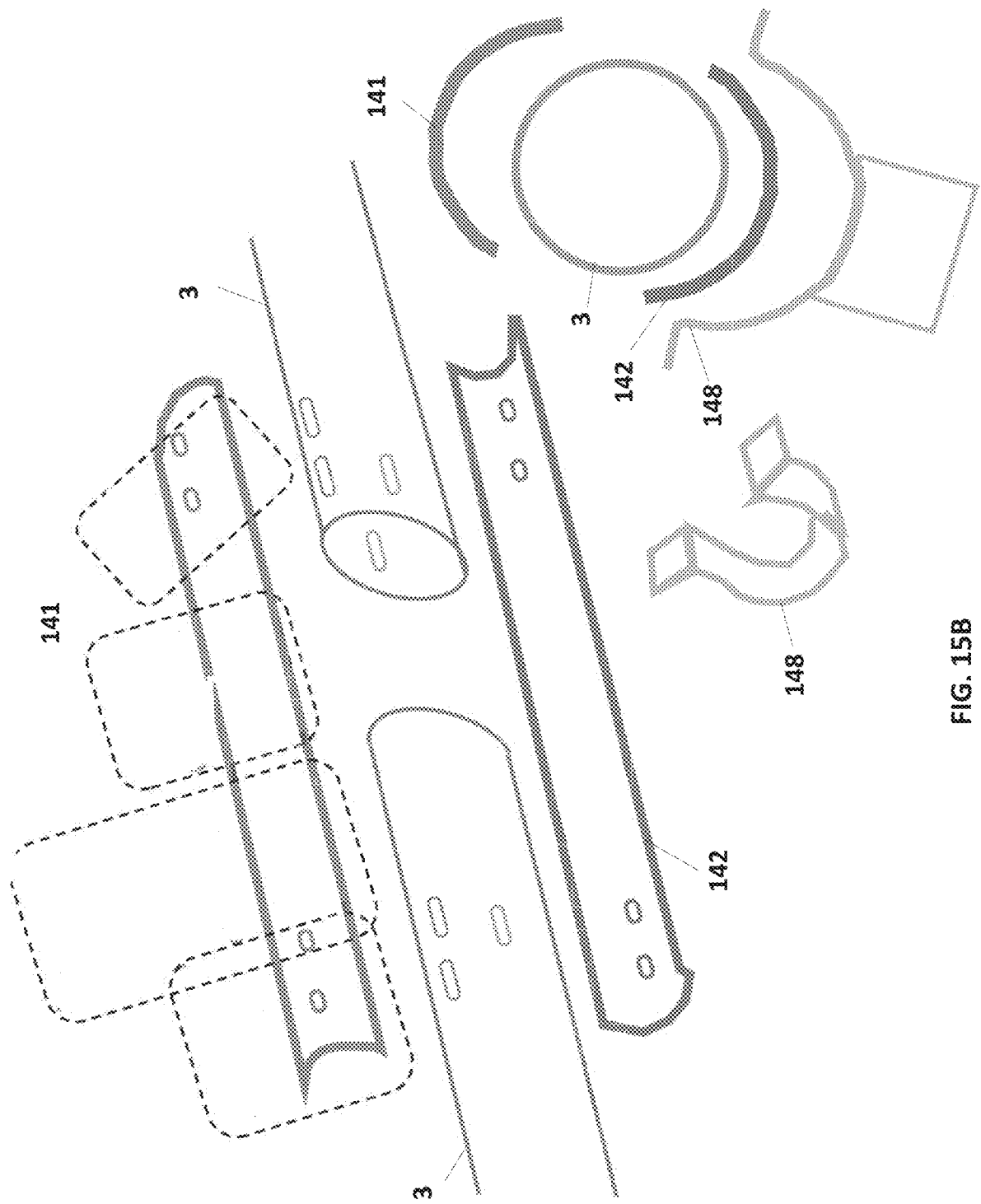

FIGS. 15A-B show exploded views of a journal-coupler 141, 142, with slots 145, 146, for coupling torque tubes 3, with exit slots 147, with one another aligning the different slots, according to some embodiments. The left portion of FIG. 15A shows a perspective view while the right portion shows a side view. In some embodiments, the top journal-coupler 141 and the bottom journal-coupler 142 have two sets of slots 145/146 that are used for aligning or mating with the exit slots 147. The two sets of slots 145/146 provide for aligning +/−1 slot for lateral adjustment. In one or more embodiments, there may be more slots 145/146 as necessary. In one or more embodiments, the torque tubes 3 have a set of three exit slots 147 on opposite sides of the torque tubes 3 (positioned as two vertical and one horizontal). In some embodiments, the exit slots 147 have a larger opening than the slots 145/146. The slots 145 and 146 of the top journal-coupler 141 and the bottom journal-coupler 142 are used as indicated by the dashed boxes as follows: the first dashed box is used for clamping the second torque tube 3 and the fourth dashed box is used for clamping the first torque tube 3; the second dashed box is a journal portion and is about eight (8) inches wide, and rides in the bearing race with +/−three (3) inches as worst case thermal expansion; the third dashed box is used for a torque tube 3 gap, which allows for access to the cables.

Figure 16C:
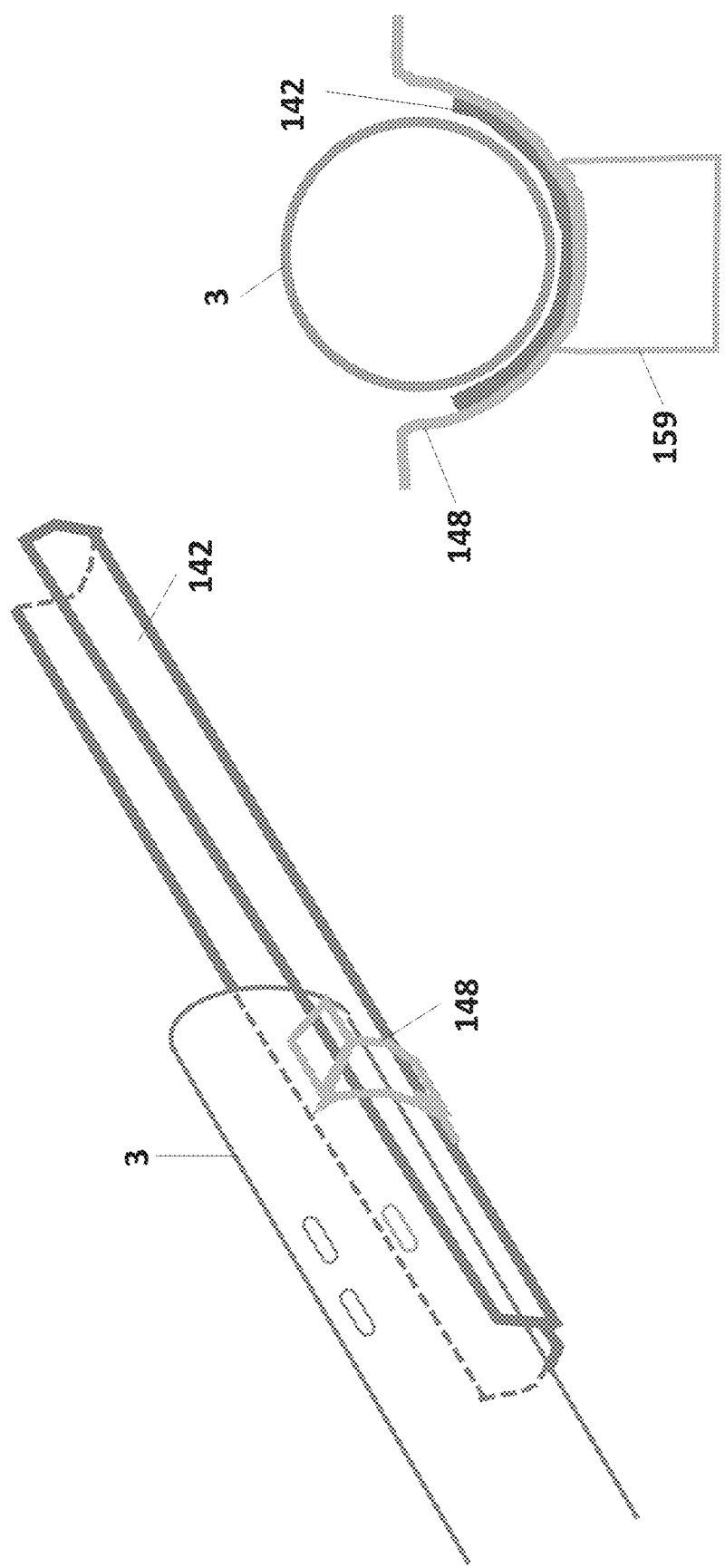
Figure 16D:
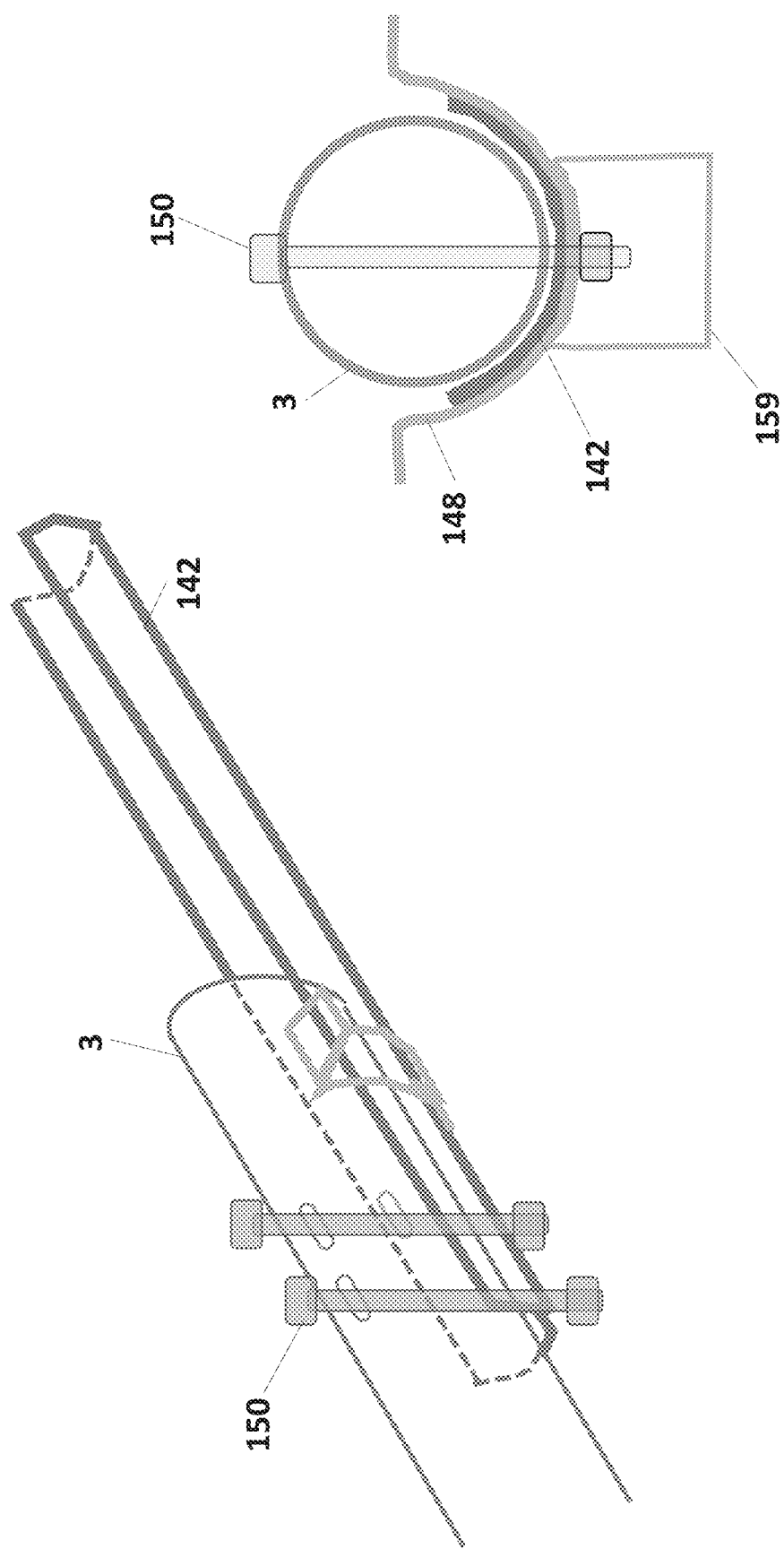
Figure 16E:
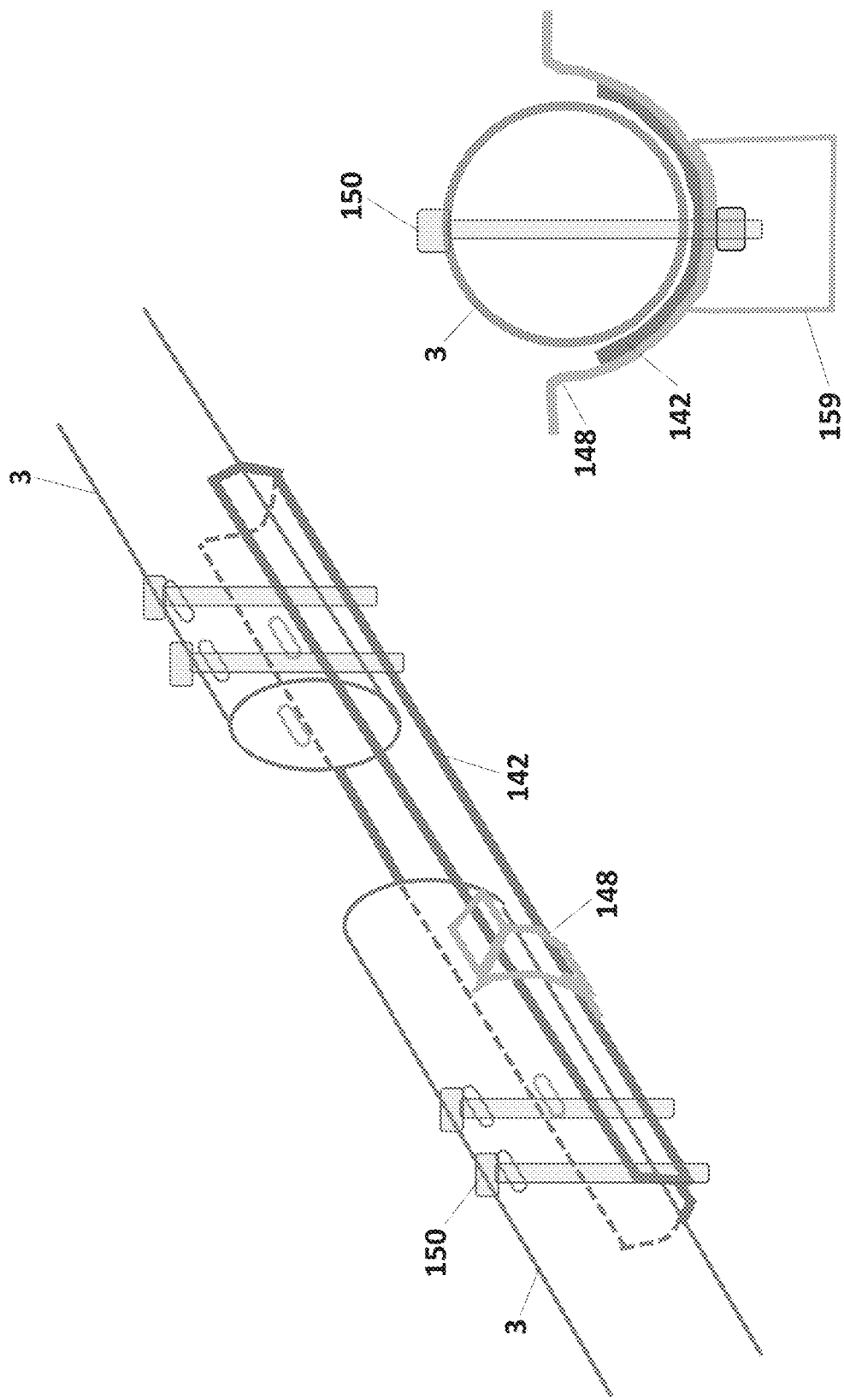
Figure 16F:
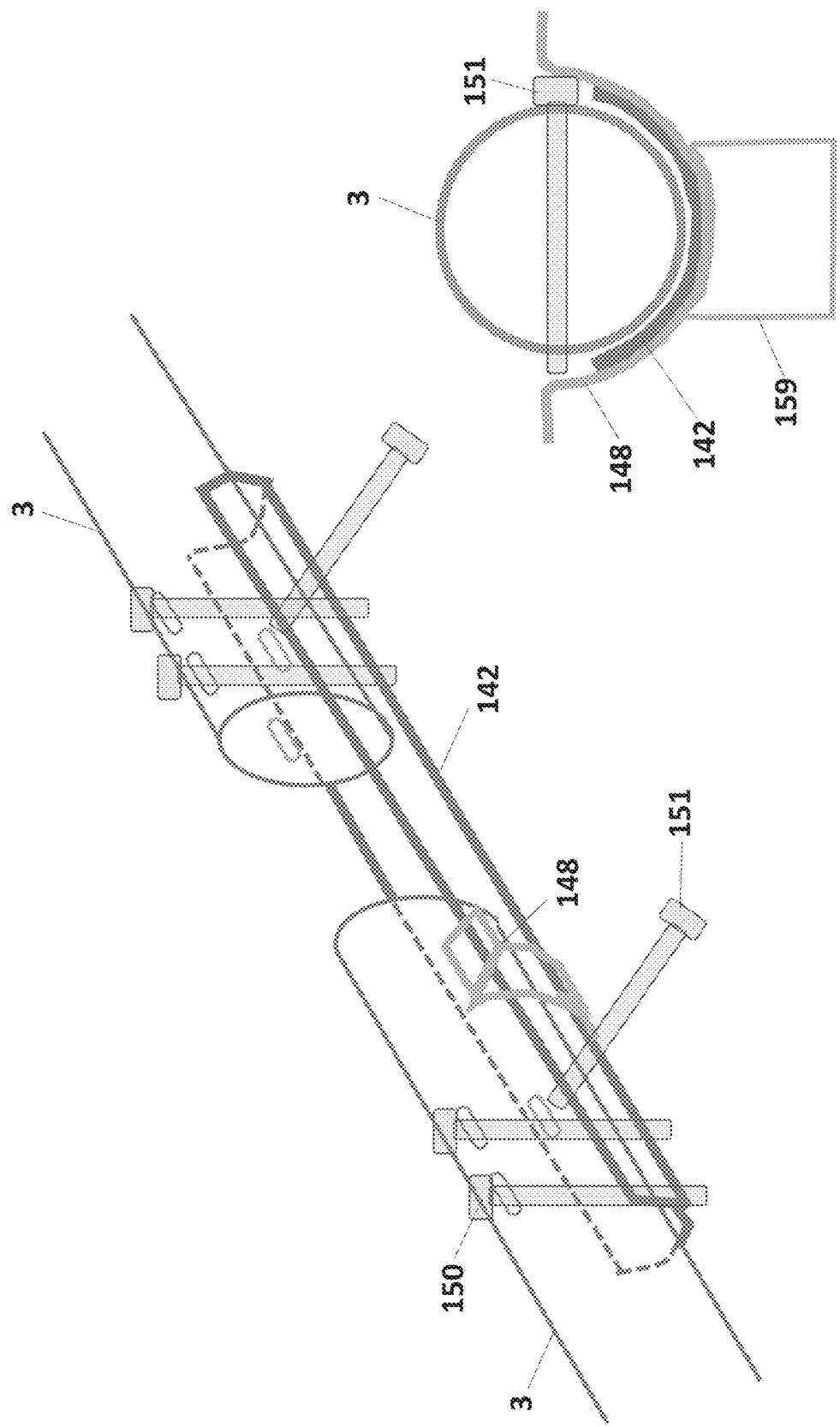
Figure 16G:
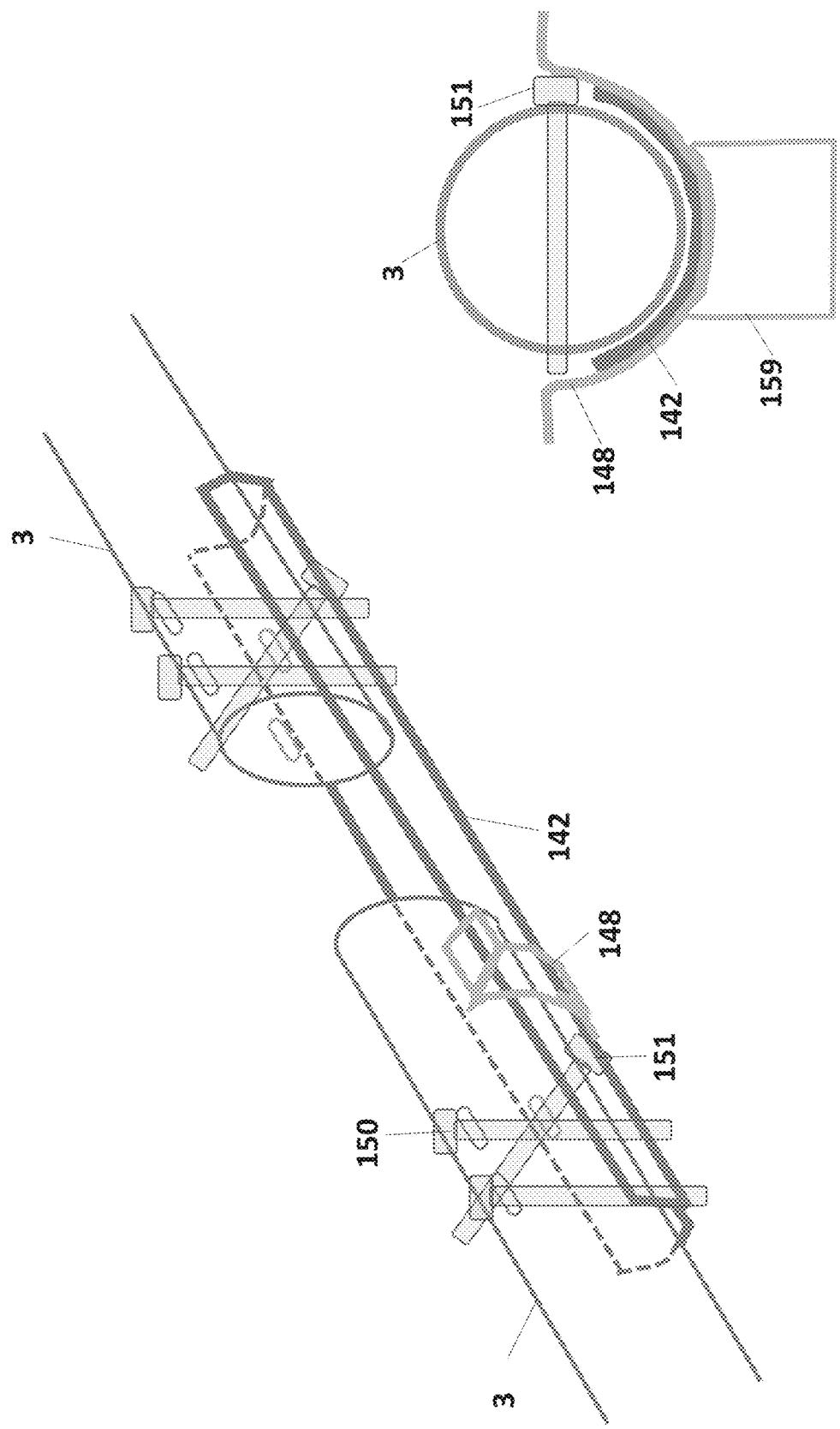
Figure 16H:
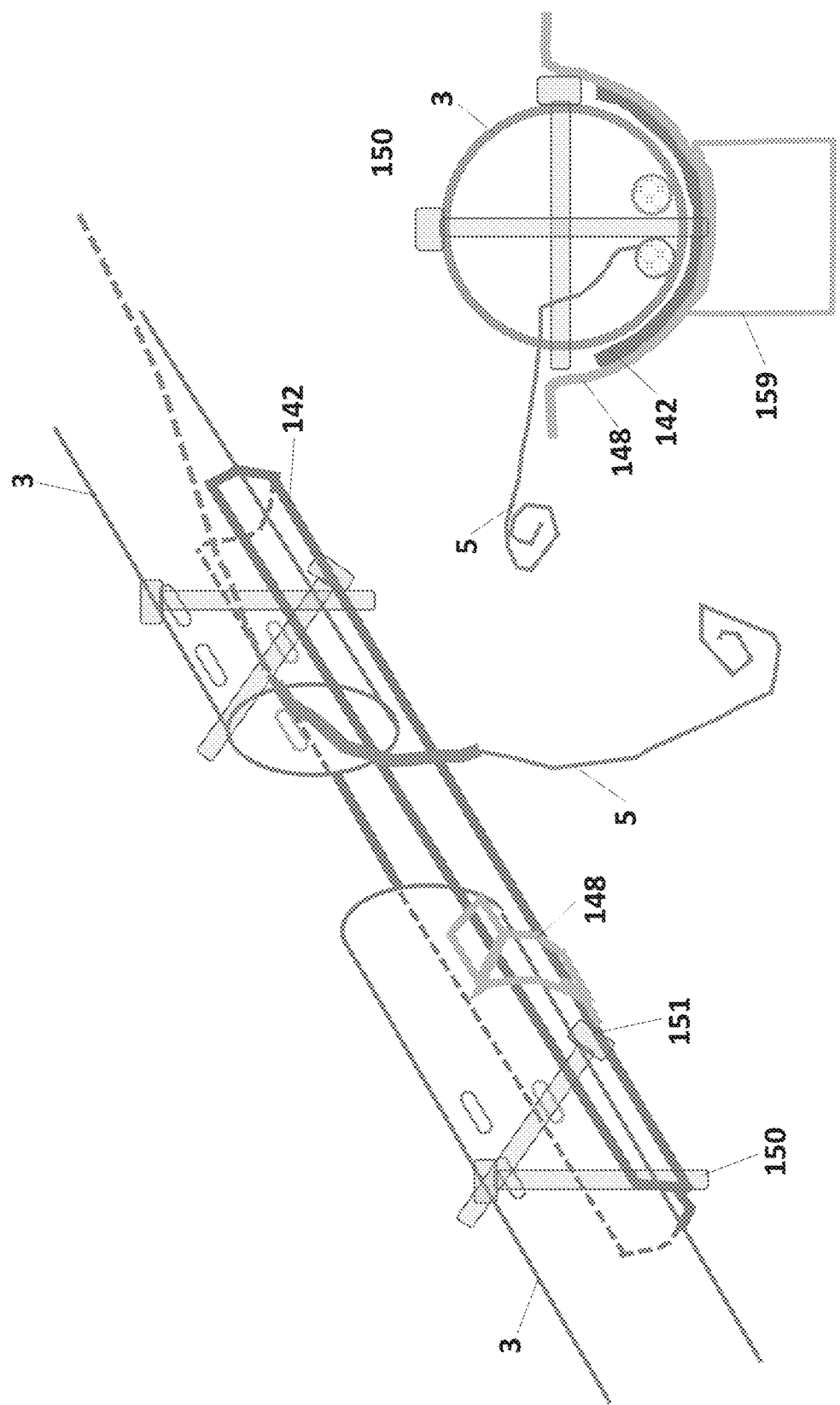
Figure 16I:
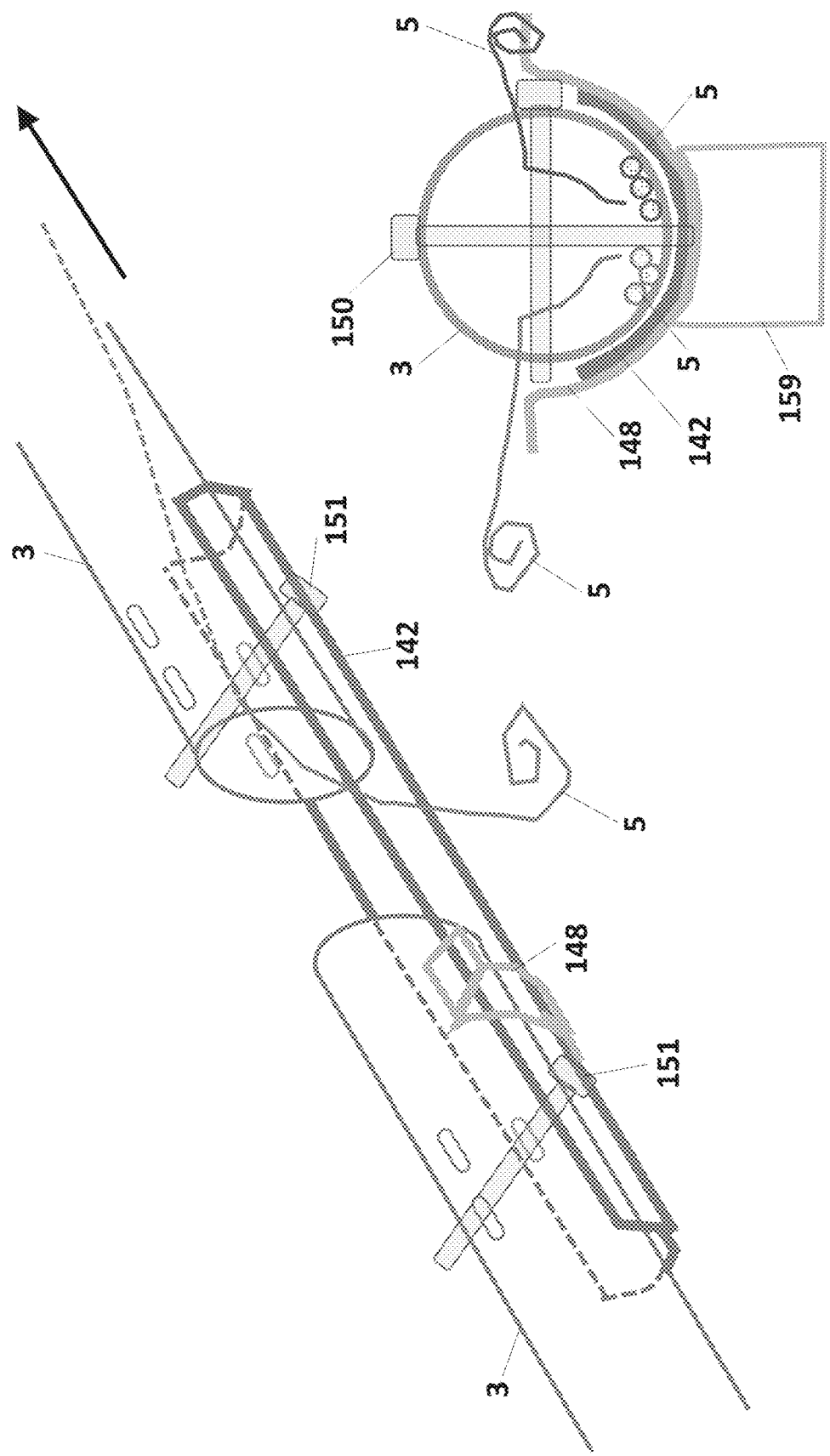
Figure 16J:
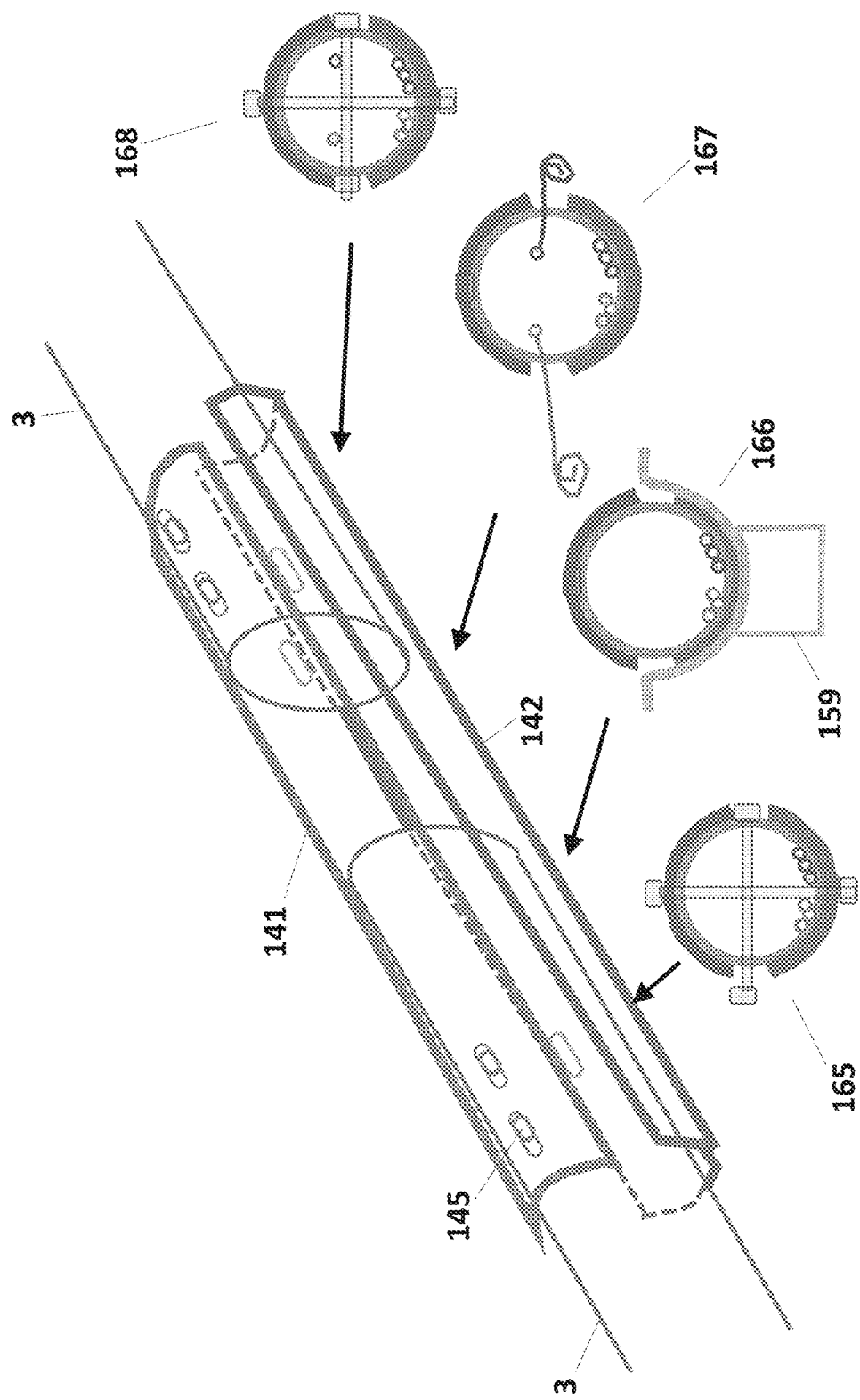
Figure 16K:
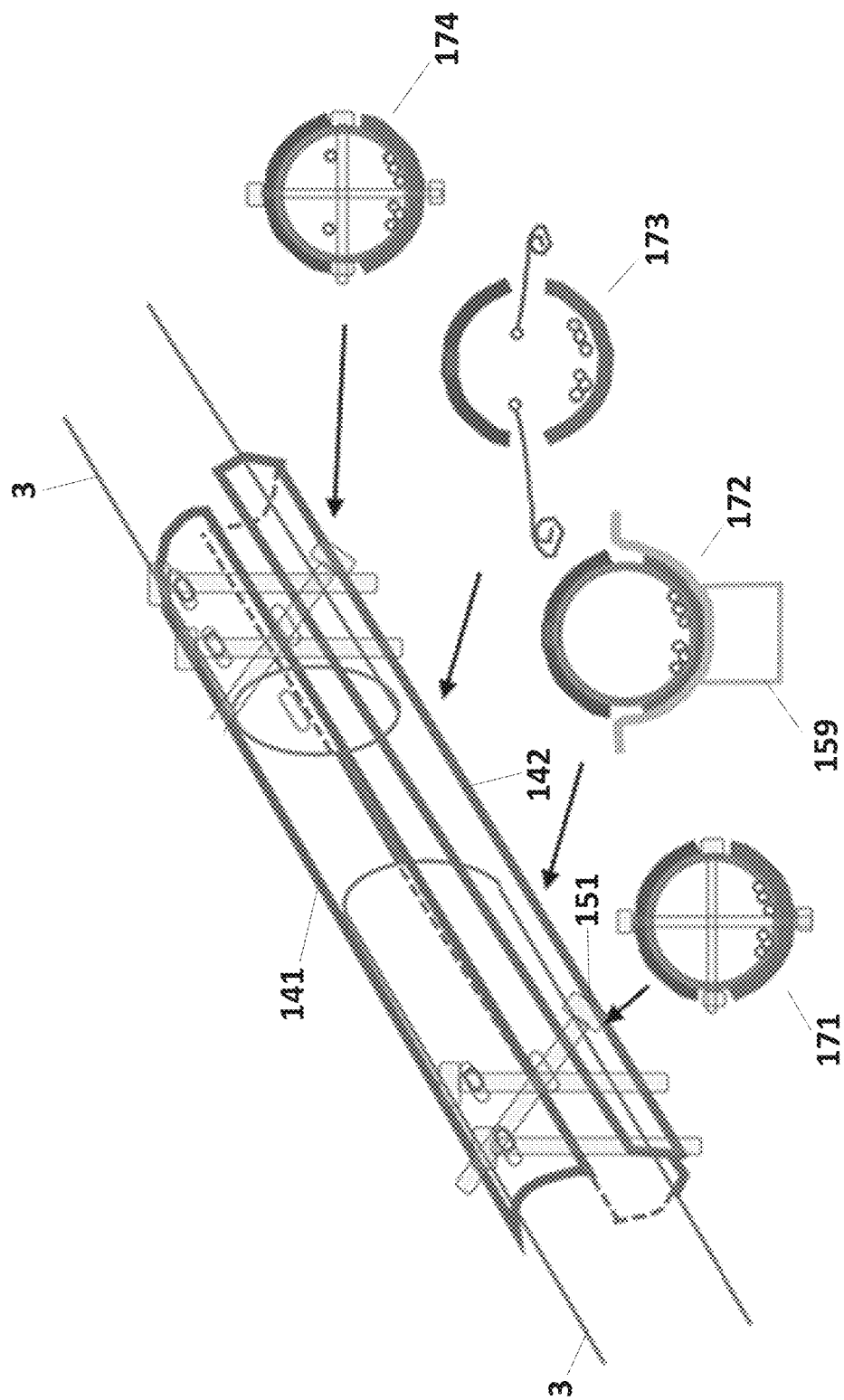

FIGS. 16A-K show components for a journal-coupler (top journal-coupler 141 and bottom journal-coupler 142), with slots 145/146, for coupling torque tubes 3, with exit slots 147, with one another and the progression of assembling a single axis tracker system, according to some embodiments. In FIG. 16B, the torque tube 3 is placed or laid into the bottom bearing race 148. The image on the right is a side view and shows the bottom bearing race 148 coupled to a pier 159 (or post). In FIGS. 16C-D the bottom journal-coupler 142 is positioned or slid under the torque tube 3, and then the temporary vertical bolts 150 are positioned in the slots to hold vertically. In FIG. 16E, another torque tube 3 is positioned on top of the bottom journal-coupler 142, and temporary vertical bolts 150 are positioned in the slots to hold vertically. In FIGS. 16F-G, horizontal bolts 151 are positioned to aid in holding the top journal-coupler 141 and bottom journal-coupler 142 to the torque tubes 3, and also provides for the pull cables 5 to be elevated in the middle of the torque tubes 3. In FIGS. 16H-K, smaller pull cables 5 are attached to larger pull cables 5 where the smaller pull cables 5 are pulled over the horizontal bolts 151 such that the cable 5 is lifted up to the midpoint of the torque tube 3. The two larger pull cables 5 are pulled up until their ends are at the next bearing in a row. The side views 165, 166, 167 and 168 show progression through deployment steps. The side views 171, 172, 173 and 174 show progression through deployment steps.

Figure 17:
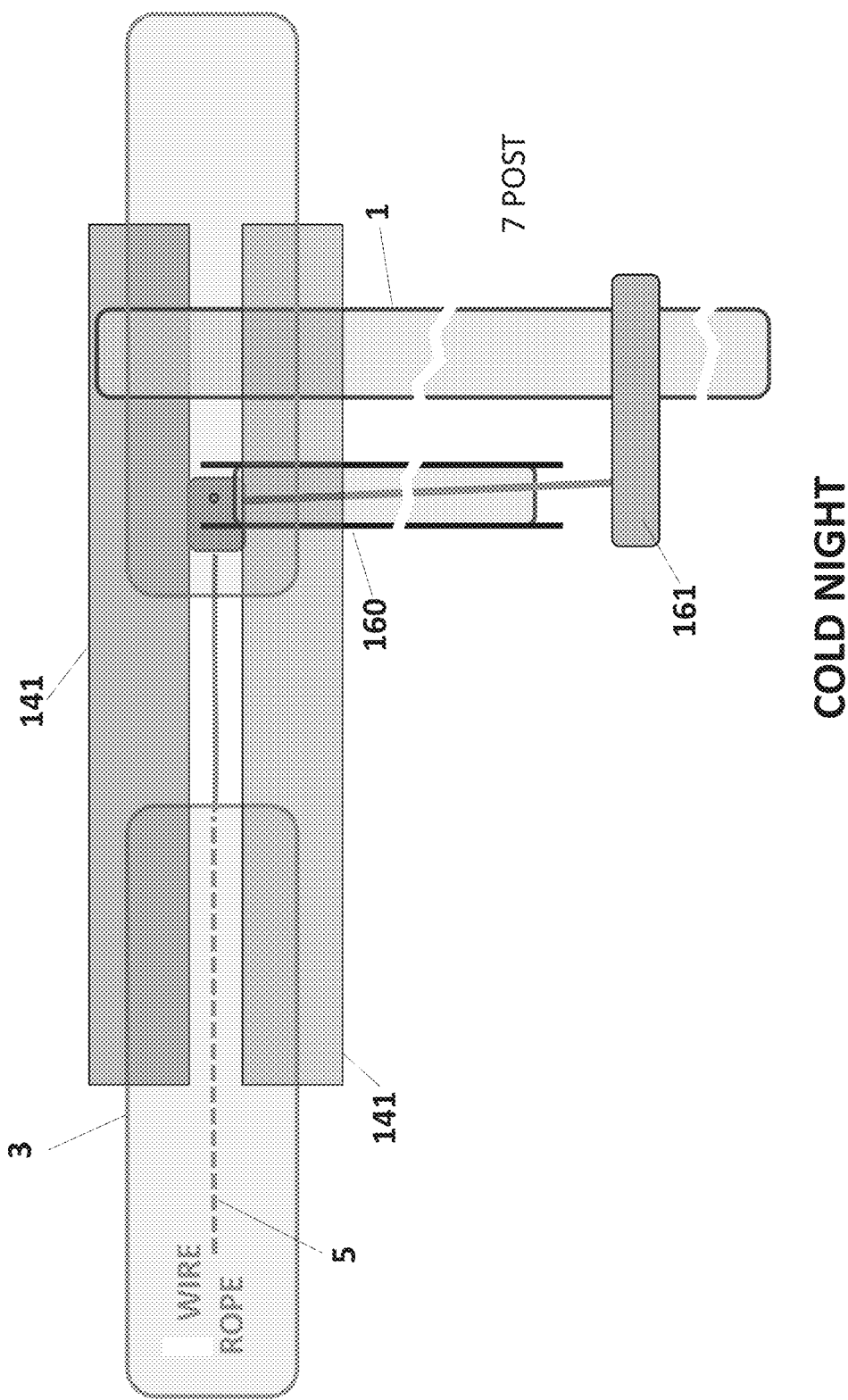
FIG. 17 shows the exit slot for a cable during a cold night, according to some embodiments.

FIG. 17 shows the exit slot for a cable 5 during a cold night, according to some embodiments. As shown, a half-pulley or lever arm 160 attaches to the bearing journal-coupler halves, and the cables 5 attaches to a cable attachment portion 161. The temperature (e.g., cold night) has an effect on the thermal contraction of the gap between torque tubes.

Figure 18:
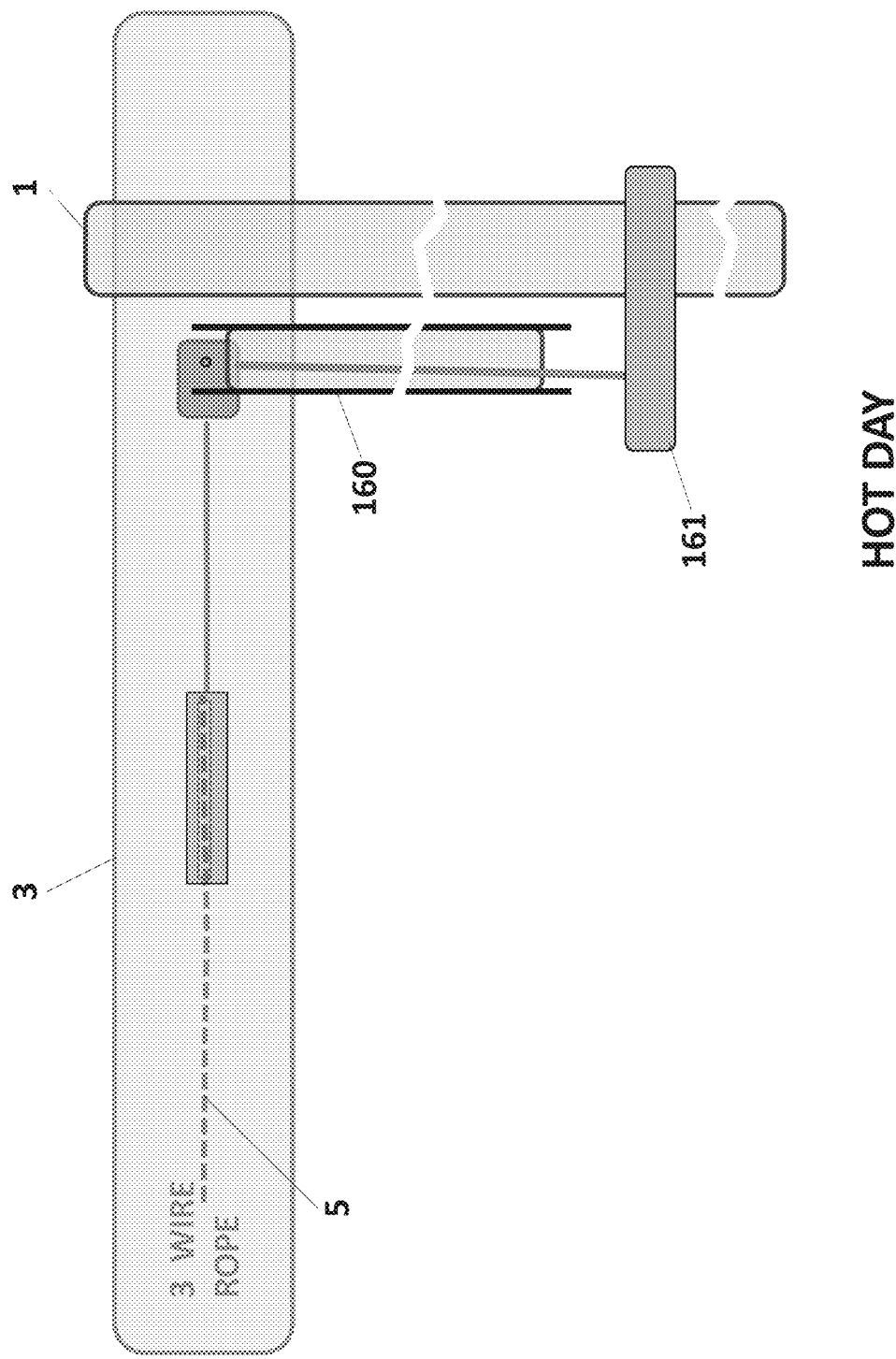
FIG. 18 shows the exit slot for a cable during a hot day, according to some embodiments.

FIG. 18 shows the exit slot for a cable 5 during a hot day, according to some embodiments. As shown, a half-pulley 160 (or lever arm) attaches to the bearing journal-coupler halves, and the cables 5 attaches to a cable attachment portion 161. The temperature (e.g., hot day) has an effect on the thermal expansion of the gap between torque tubes.

Figure 19:
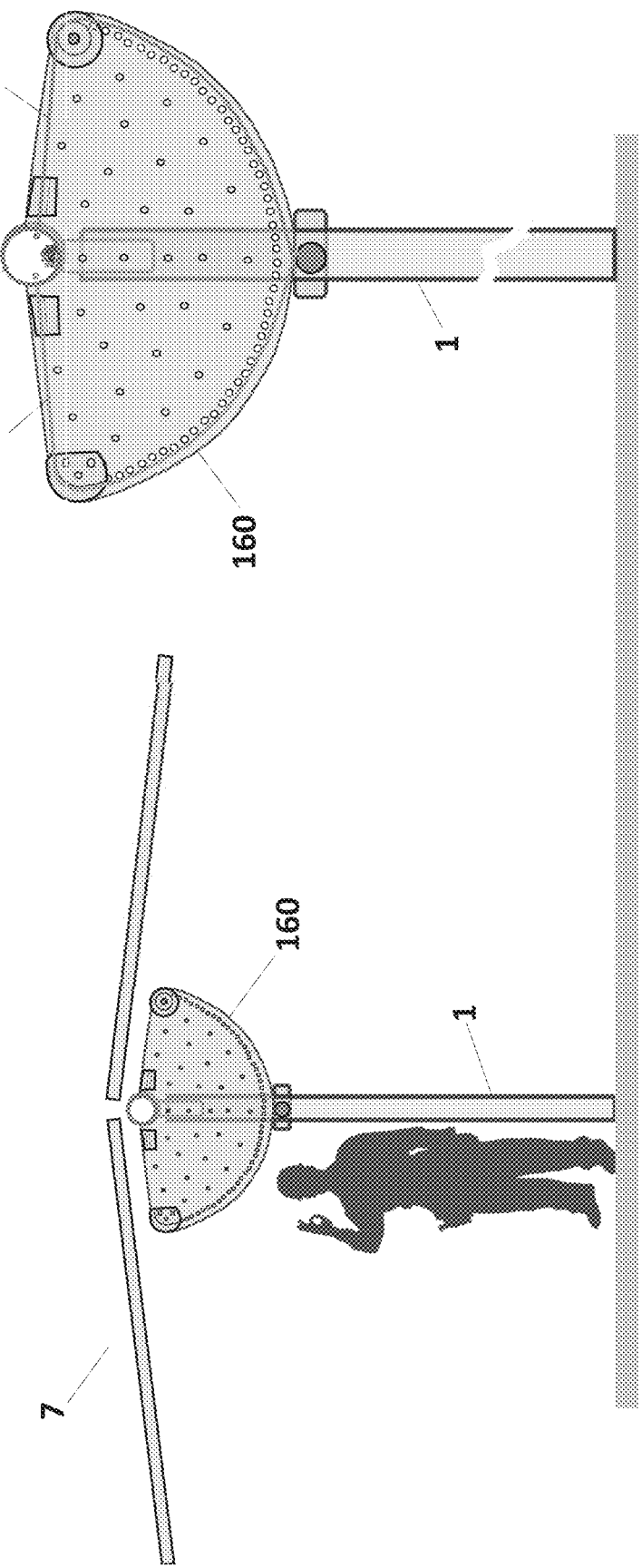
FIG. 19 shows a half-pulley employed with a single axis tracker system shown in a first position for the solar panels, according to some embodiments.

FIG. 19 shows a half-pulley 160 employed with a single axis tracker system shown in a first position for the solar panels 7, according to some embodiments. As shown, on the right-hand-side shows a closer view of the half-pulley 160 with torque tubes 3 and cables 5, where the half-pulley 160 is mounted to a pier 1.

Figure 20:
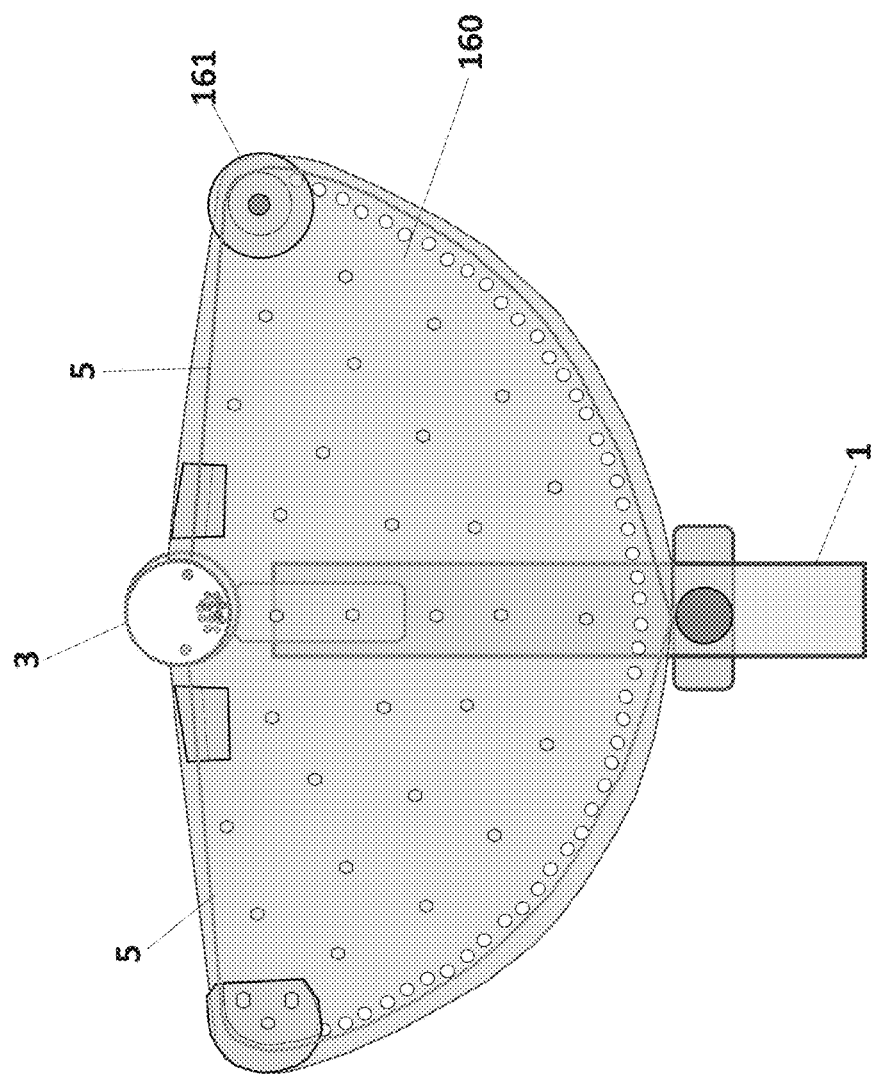
FIG. 20 shows an isolated view of a half-pulley coupled to a torque tube and pier, according to some embodiments.
Figure 21A:
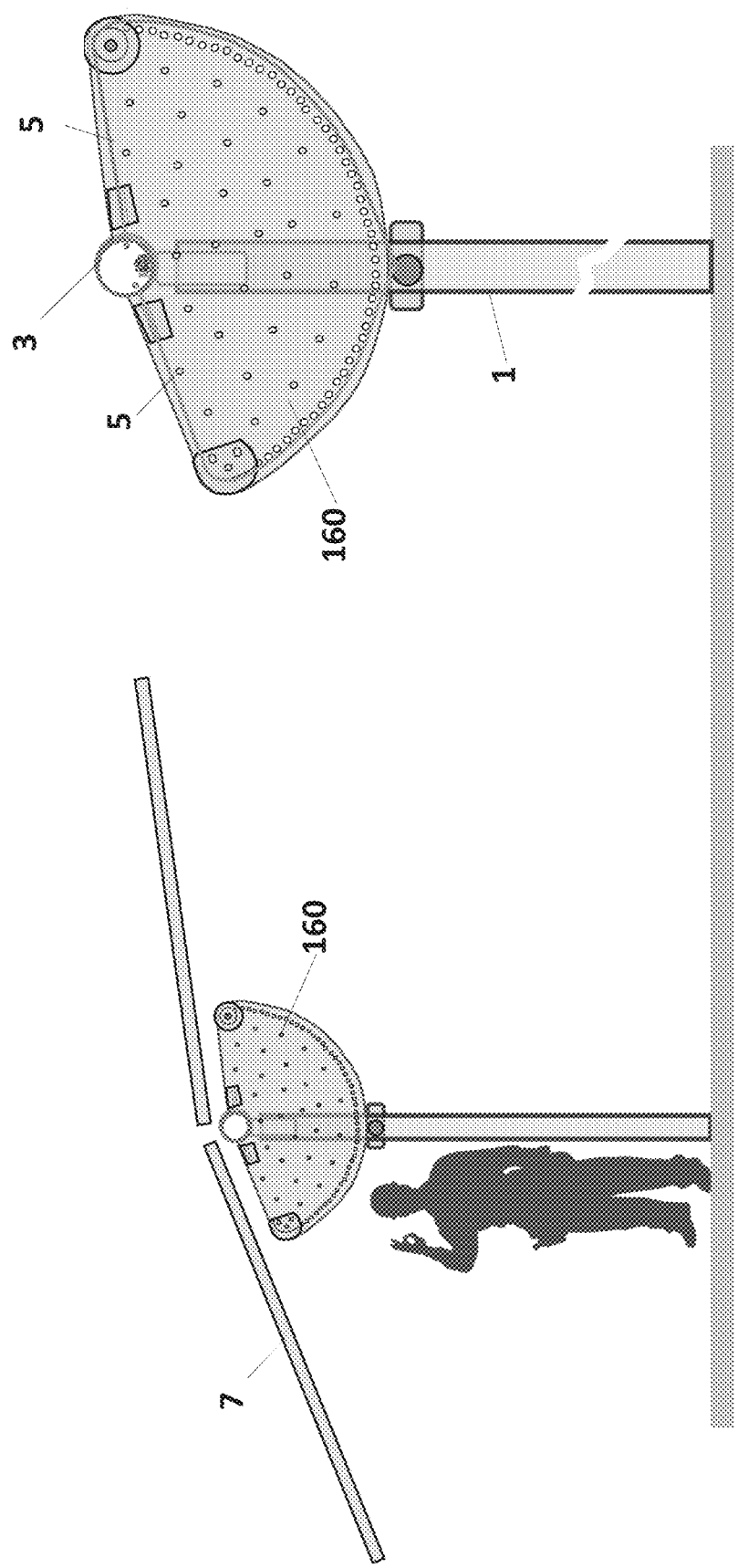
Figure 21C:
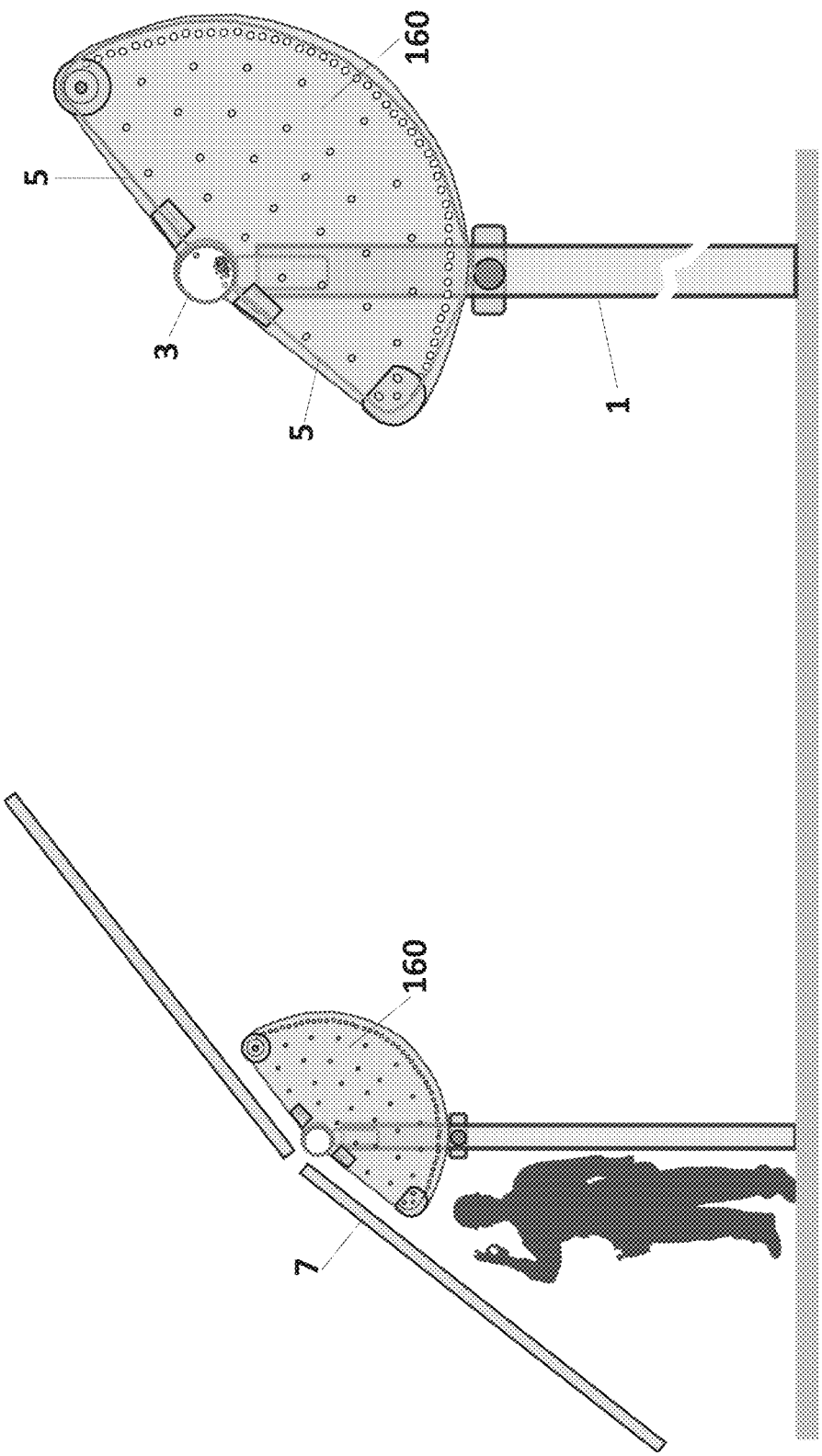
Figure 22A:
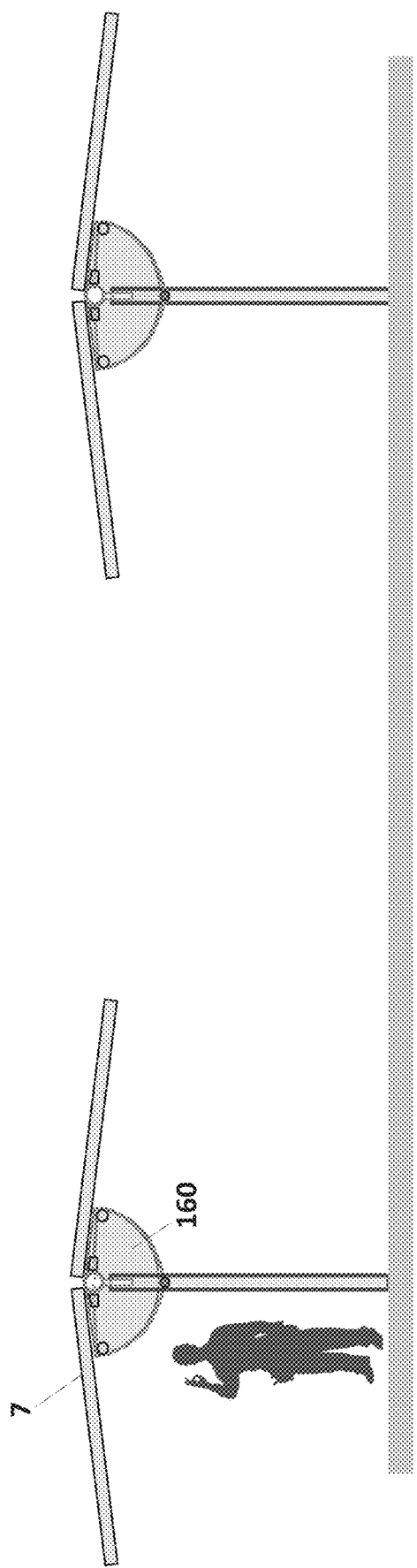
Figure 22B:
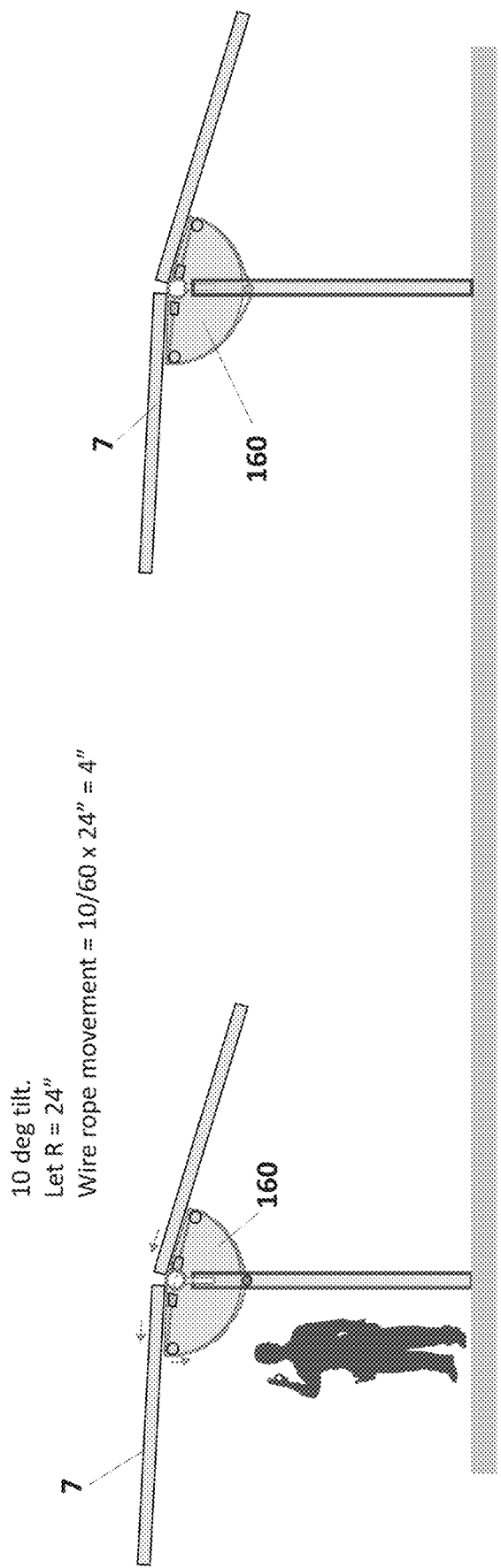
Figure 22D:
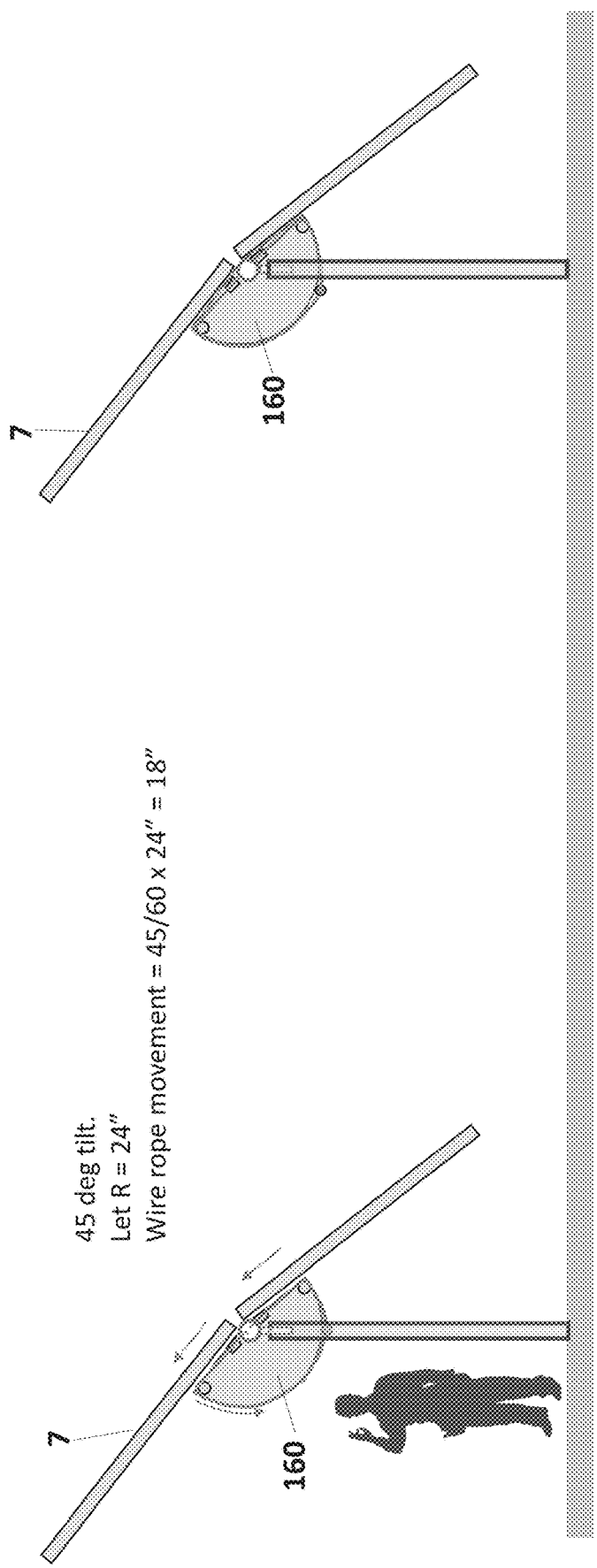
Figure 22E:
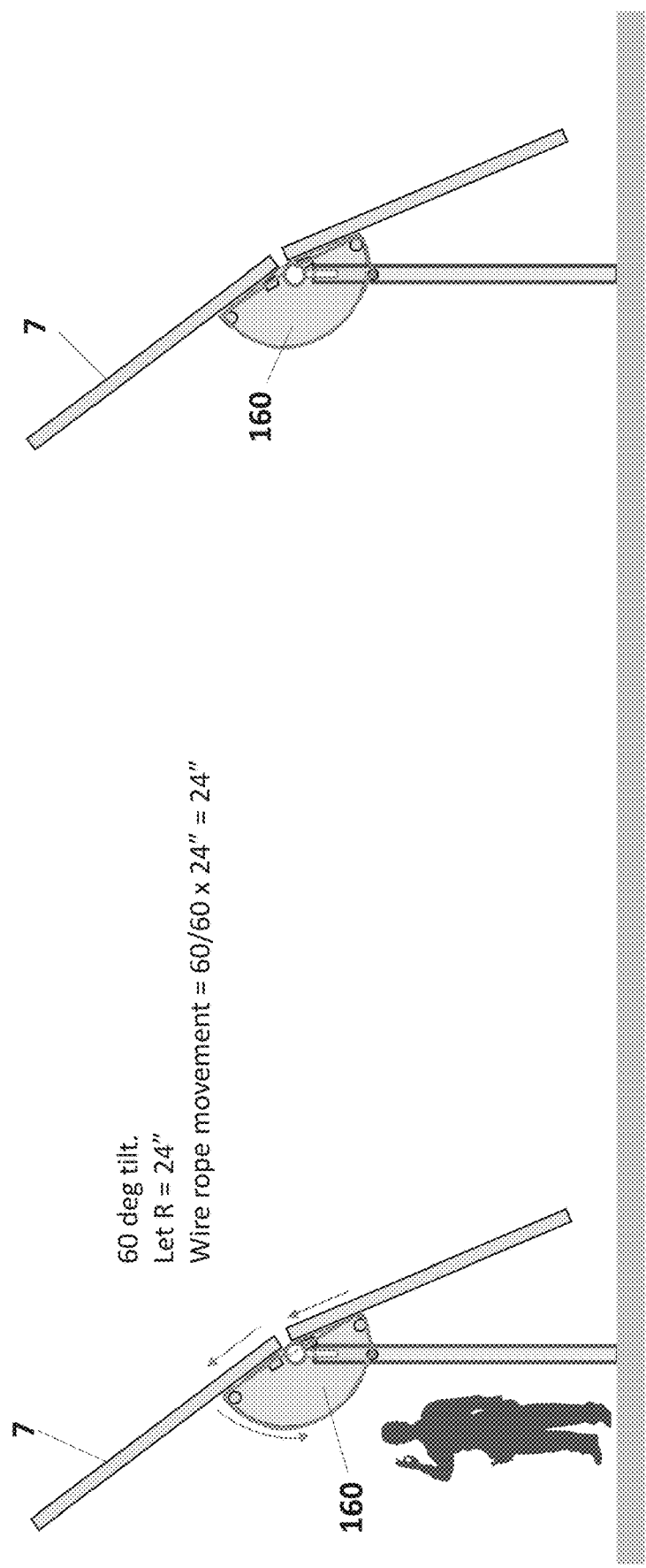

FIG. 20 shows an isolated view of a half-pulley 160 coupled to a torque tube 3 and pier 1, according to some embodiments. In some embodiments, the half-pulley 160 connects to the bearing journal-coupler and two small cables 5 (wire ropes) exit the gap of the journal-coupler. The cable 5 wires travel parallel to the torque tube 3, then proceed to a ninety (90) degree radius turn (via a pulley 161 or HDPE) for sideways travel. The cable 5 wires travel out to the end of the upper portion of the half-pulley 160, where there is a pulley 161 (or a 90-degree bend radius (HDPE)) to direct the cable 5 wires vertically down to the lower portion of the half-pulley 160. The cable 5 wires also travel along a groove of a large (two inch radius, 1 meter radius, etc.) half-pulley 160, which is slippery (HDPE) or made of many rivets with spinning sleeves to behave as small idler pulleys. In one or more embodiments, a lever arm (for straight wire and variable diameter winch drum) or the half-pulley 160 needs to be close to the pier 1, but never hit it during thermal expansion of the torque tubes 3. The cables 5 then connect to the pier 1, such as a protruding knob to minimize sideways pull on the wire of the cable 5.

FIGS. 21A-D show the half-pulley 160 coupled to a torque tube 3 and pier 1 in progression of solar panel 7 angles tilted to the left (counterclockwise), according to some embodiments.

FIGS. 22A-E show the half-pulley 160 coupled to a torque tube 3 and pier 1 in progression of solar panel 7 angles tilted to the right (clockwise), according to some embodiments.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. An apparatus for a solar tracker assembly comprising:
   a component including a plurality of pulleys or a plurality of slide surfaces;
   a first torque tube coupled with the component, the first torque tube including a cable slot;
   a first pull cable coupled to a first and a second pulley of the plurality of pulleys or to a first and a second slide surface of the plurality of slide surfaces;
   a second pull cable coupled to a third and a fourth pulley of the plurality of pulleys or to a third and a fourth slide surface of the plurality of slide surfaces; and
   a first post coupled with the torque tube, the first post including a connection point coupled to the first pull cable and the second pull cable;
   wherein the first pull cable has a first pull cable section that is disposed within the first torque tube, and the second pull cable has a second pull cable section that is disposed within the first torque tube.

2. The apparatus of claim 1, wherein an end of the first pull cable and an end of the second pull cable are each coupled with a drive that is configured to rotate the first torque tube.

3. The apparatus of claim 1, wherein:
   the component comprises a half-pulley having a semi-circular radius; and
   the first and second pull cables slip around the half-pulley.

4. The apparatus of claim 3, wherein
   the half-pulley includes a groove for the first and second pull cables; and
   a pull force on the first pull cable or the second pull cable results in the first torque tube rotating in an east or west direction.

5. The apparatus of claim 1, wherein the component is a lever arm, and the first pulley is disposed at a first end of the lever arm, and the third pulley is disposed at a second end of the lever arm.

6. The apparatus of claim 5, wherein the first torque tube is coupled with a second torque tube.

7. The apparatus of claim 6, wherein a rubbing turning radius is employed to retain and redirect a first pull cable section and a second pull cable section along a length of the first torque tube and the second torque tube.

8. The apparatus of claim 5, wherein the second pulley and the fourth pulley are each disposed adjacent one another near a middle portion of the lever arm.

9. The apparatus of claim 8, further comprising an idler pulley disposed near an end of the second torque tube, the idler pulley coupled to the first pull cable and the second pull cable.

10. The apparatus of claim 9, wherein the idler pulley is coupled to a bracket that is coupled to a second post, and the second post is coupled with the drive.

11. The apparatus of claim 10, wherein the first post and the second post are coupled to a ground surface having a variable slope in a north-south direction, and the first torque tube and the second torque tube are disjointed for up-down elevation changes.

12. A system for a solar tracker assembly comprising:
    a component including a plurality of pulleys or a plurality of slide surfaces;
    a first torque tube coupled with the component, the first torque tube including a cable slot;
    a second torque tube coupled with the first torque tube;
    a first pull cable coupled to a first and a second pulley of the plurality of pulleys or to a first and a second slide surface of the plurality of slide surfaces;
    a second pull cable coupled to a third and a fourth pulley of the plurality of pulleys or to a third and a fourth slide surface of a plurality of slide surfaces; and
    a first post coupled with the first torque tube and the second torque tube, the first post including a connection point coupled to the first pull cable and the second pull cable;
    wherein the first pull cable has a first pull cable section that is disposed within the first torque tube and the second torque tube, and the second pull cable has a second pull cable section that is disposed within the first torque tube and the second torque tube.

13. The system of claim 12, wherein an end of the first pull cable and an end of the second pull cable are each coupled with a drive that is configured to rotate the first torque tube and the second torque tube.

14. The system of claim 12, wherein a rubbing turning radius is employed to retain and redirect a first pull cable section and a second pull cable section along a length of the first torque tube and the second torque tube.

15. The system of claim 12, wherein:
    the component comprises a half-pulley having a semi-circular radius;
    the first and second pull cables slip around the half-pulley;
    the half-pulley includes a groove for the first and second pull cables; and
    a pull force on the first pull cable or the second pull cable results in the first torque tube and the second torque tube rotating in an east or west direction.

16. The system of claim 12, wherein the component is a lever arm, and the first pulley is disposed at a first end of the lever arm, and the third pulley is disposed at a second end of the lever arm.

17. The system of claim 16, wherein the second pulley and the fourth pulley are each disposed adjacent one another near a middle portion of the lever arm.

18. The system of claim 17, further comprising an idler pulley disposed near an end of the second torque tube, the idler pulley coupled to the first pull cable and the second pull cable.

19. The system of claim 18, wherein the idler pulley is coupled to a bracket that is coupled to a second post, and the second post is coupled with the drive.

20. The system of claim 19, wherein the first post and the second post are coupled to a ground surface having a variable slope in a north-south direction, and the first torque tube and the second torque tube are disjointed for up-down elevation changes.

* * * * *